US010399577B2

(12) United States Patent
Liu

(10) Patent No.: US 10,399,577 B2
(45) Date of Patent: Sep. 3, 2019

(54) RAILROAD TRAIN WITH LENGTH MORE THAN PLATFORM AND ITS MARSHALLING SYSTEM

(71) Applicant: Xi'an Shiyun Transportation Equipment Co., LTD, Shaanxi, Xi'an (CN)

(72) Inventor: Jian Liu, Xi'an (CN)

(*) Notice: Subject to any disclaimer, the term of this patent is extended or adjusted under 35 U.S.C. 154(b) by 511 days.

(21) Appl. No.: 14/914,894

(22) PCT Filed: Aug. 25, 2014

(86) PCT No.: PCT/CN2014/000795
§ 371 (c)(1),
(2) Date: Feb. 26, 2016

(87) PCT Pub. No.: WO2015/027666
PCT Pub. Date: Mar. 5, 2015

(65) Prior Publication Data
US 2016/0200327 A1 Jul. 14, 2016

(30) Foreign Application Priority Data

Aug. 26, 2013 (CN) .......................... 2013 1 0374212
Aug. 26, 2013 (WO) ................ PCT/CN2013/001011
(Continued)

(51) Int. Cl.
*G07B 15/02* (2011.01)
*B61D 13/00* (2006.01)
(Continued)

(52) U.S. Cl.
CPC ................ *B61D 13/00* (2013.01); *B61B 1/00* (2013.01); *B61D 17/00* (2013.01); *B61L 21/00* (2013.01);
(Continued)

(58) Field of Classification Search
CPC .......... B61D 13/00; B61D 17/00; B61B 1/00; B61L 21/00; B61L 25/02; G07B 15/00; Y02T 30/30
(Continued)

(56) References Cited

U.S. PATENT DOCUMENTS

| 2006/0173790 | A1* | 8/2006 | Park | G07B 15/063 |
| | | | | 705/13 |
| 2007/0271455 | A1* | 11/2007 | Nakano | G06Q 20/1235 |
| | | | | 713/154 |
| 2009/0241023 | A1* | 9/2009 | Suzuki | G07B 15/00 |
| | | | | 715/273 |

FOREIGN PATENT DOCUMENTS

| CN | 103253276 A | 8/2013 |
| CN | 103273923 A | 9/2013 |

(Continued)

*Primary Examiner* — Karl D Frech
(74) *Attorney, Agent, or Firm* — Morriss O'Bryant Compagni Cannon, PLLC

(57) ABSTRACT

A railroad train marshaling system or marshaling method is disclosed. The railroad train includes cars within platform area which are made up of several cars; door-free cars which are connected with the cars within platform area at both ends or one end and made up of at least one car with no side door for passengers to get on and off the train. When the railroad train stops at the platform, the cars within platform area are arranged to stop within the area of platform or corresponding to the platform, the door-free car is arranged to stop beyond platform area and passengers in the door-free car will get to the platform directly from the car within platform area. The sum of length of door-free car and cars within platform area is more than that of the platform.

16 Claims, 6 Drawing Sheets

(30) Foreign Application Priority Data

| Date | Country | Number |
|---|---|---|
| Mar. 7, 2014 | (CN) | 2014 1 0081930 |
| Mar. 7, 2014 | (CN) | 2014 1 0081946 |
| Mar. 7, 2014 | (CN) | 2014 1 0081947 |
| Mar. 7, 2014 | (CN) | 2014 1 0081948 |
| Mar. 7, 2014 | (CN) | 2014 1 0081949 |
| Mar. 8, 2014 | (CN) | 2014 1 0092645 |
| Mar. 10, 2014 | (CN) | 2014 1 0084472 |
| Mar. 10, 2014 | (CN) | 2014 1 0084474 |
| Mar. 10, 2014 | (CN) | 2014 1 0084477 |
| Mar. 10, 2014 | (CN) | 2014 1 0084479 |
| Mar. 10, 2014 | (CN) | 2014 1 0084488 |
| Mar. 10, 2014 | (CN) | 2014 1 0085203 |
| Mar. 10, 2014 | (WO) | PCT/CN2014/000229 |
| Jun. 10, 2014 | (CN) | 2014 1 0253695 |

(51) Int. Cl.
*B61L 21/00* (2006.01)
*B61L 25/02* (2006.01)
*G07B 15/00* (2011.01)
*B61D 17/00* (2006.01)
*B61B 1/00* (2006.01)

(52) U.S. Cl.
CPC .............. *B61L 25/02* (2013.01); *G07B 15/00* (2013.01); *Y02T 30/30* (2013.01)

(58) Field of Classification Search
USPC .................. 235/384, 382; 715/273; 713/154; 705/13
See application file for complete search history.

(56) References Cited

FOREIGN PATENT DOCUMENTS

| | | |
|---|---|---|
| CN | 103448733 A | 12/2013 |
| CN | 103847752 A | 6/2014 |
| CN | 103847753 A | 6/2014 |
| CN | 103847754 A | 6/2014 |
| CN | 103863331 A | 6/2014 |
| EP | 2162379 A1 | 3/2010 |
| SE | 9300077 L | 7/1994 |

\* cited by examiner

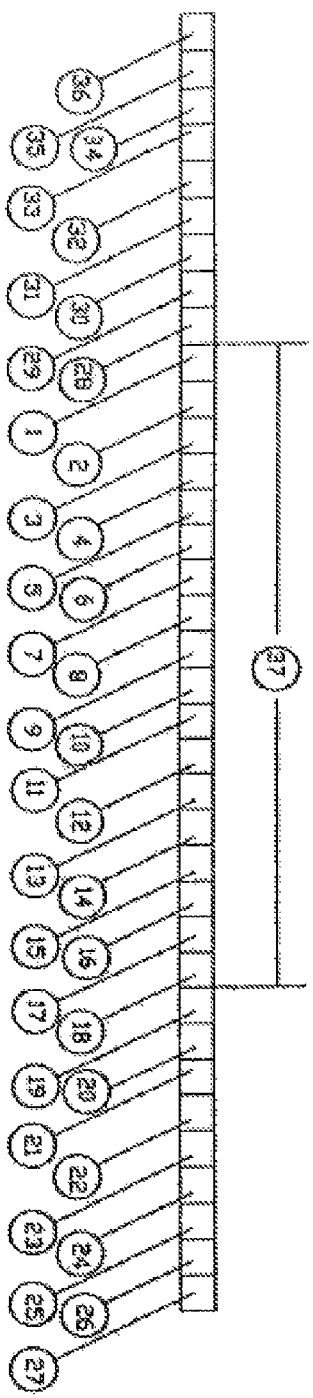
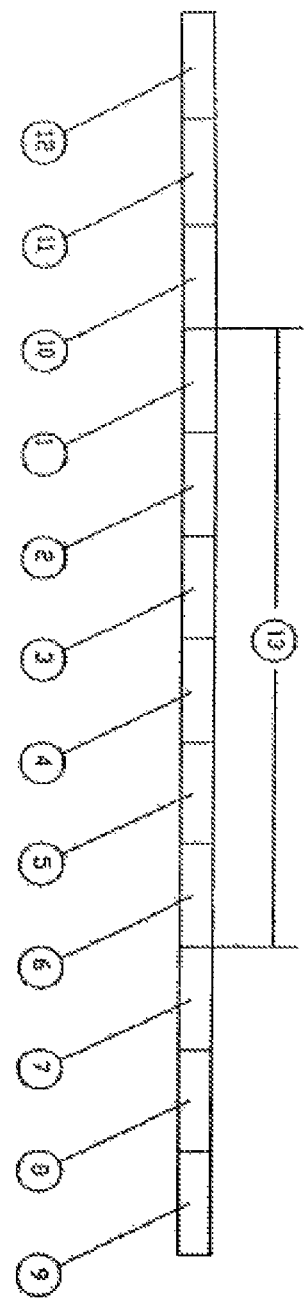
Fig. 1-3                    Fig. 1-4

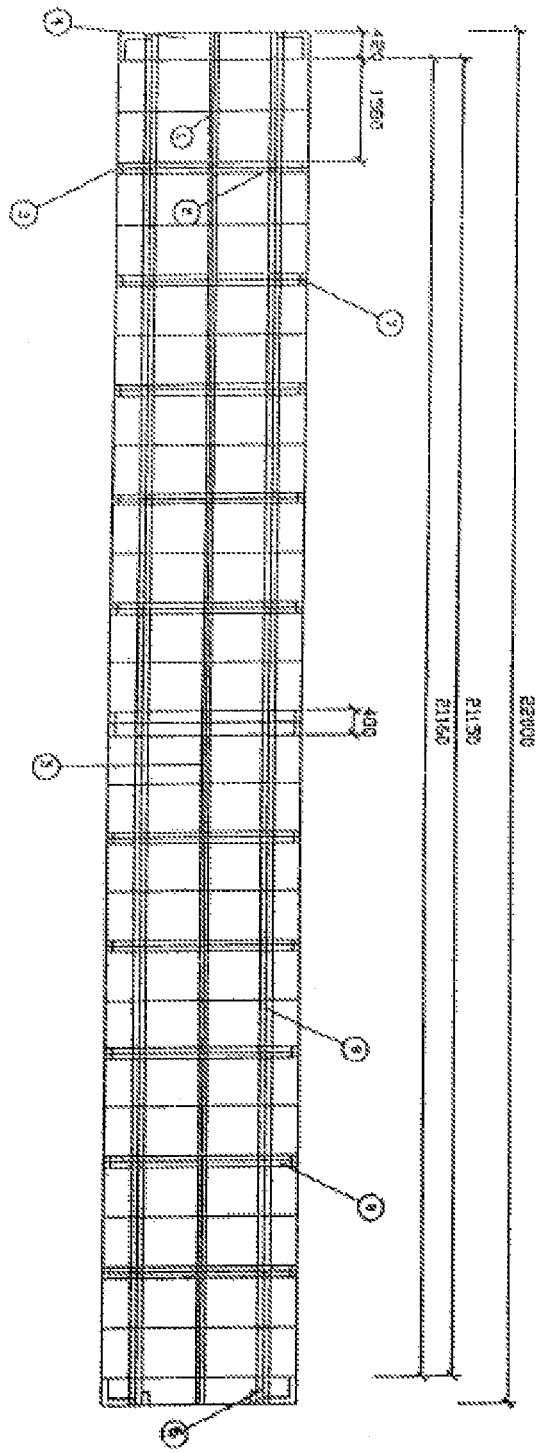 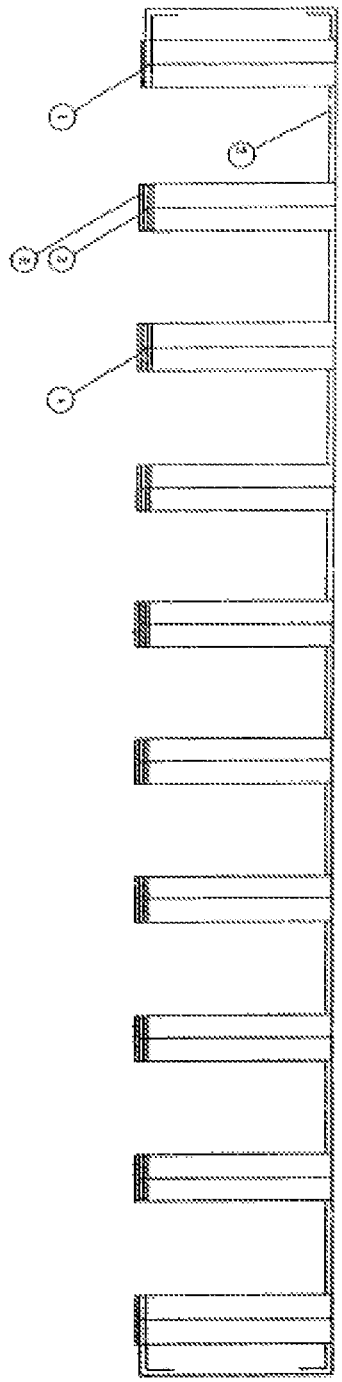
Fig. 2-1
Fig. 2-2

Preferential Price Parameter Table and Riding Section Distribution Structure
Riding Section Distribution Structure: 10 white ----- 5 blue ----- 5 yellow ----- 5 red

|  | Riding section guidance chart electronic display: white riding section | Riding section guidance chart electronic display: blue riding section | Riding section guidance chart electronic display: yellow riding section | Riding section guidance chart electronic display: red riding section |
|---|---|---|---|---|
| 80% of discounted ticket price |  | 0.40 yuan Blue railroad section | 0.80 yuan Yellow railroad section | 1.10 yuan Red railroad section |
| Discounted ticket price |  | 0.50 yuan Blue railroad section | 1.00 yuan Yellow railroad section | 1.50 yuan Red railroad section |
| Original ticket price / Station no. | 2.00 yuan | 3.00 yuan | 4.00 yuan | 5.00 yuan |
| Station no. 1 | 2,3,4,5,6,7,8,9,10,11 | 12,13,14,15,16 | 17,18,19,20,21 | 22,23,24,25,26 |
| Station no. 2 | 3,4,5,6,7,8,9,10,11,12 | 13,14,15,16,17 | 18,19,20,21,22 | 23,24,25,26 |
| Station no. 3 | 4,5,6,7,8,9,10,11,12,13 | 14,15,16,17,18 | 19,20,21,22,23 | 24,25,26 |
| Station no. 4 | 5,6,7,8,9,10,11,12,13,14 | 15,16,17,18,19 | 20,21,22,23,24 | 25,26 |
| Station no. 5 | 6,7,8,9,10,11,12,13,14,15 | 16,17,18,19,20 | 21,22,23,24,25 | 26 |
| Station no. 6 | 7,8,9,10,11,12,13,14,15,16 | 17,18,19,20,21 | 22,23,24,25,26 |  |
| Station no. 7 | 8,9,10,11,12,13,14,15,16,17 | 18,19,20,21,22 | 23,24,25,26 |  |
| Station no. 8 | 9,10,11,12,13,14,15,16,17,18 | 19,20,21,22,23 | 24,25,26 |  |
| Station no. 9 | 10,11,12,13,14,15,16,17,18,19 | 20,21,22,23,24 | 25,26 |  |
| Station no. 10 | 11,12,13,14,15,16,17,18,19,20 | 21,22,23,24,25 | 26 |  |
| Station no. 11 | 12,13,14,15,16,17,18,19,20,21 | 22,23,24,25,26 |  |  |
| Station no. 12 | 13,14,15,16,17,18,19,20,21,22 | 23,24,25,26 |  |  |
| Station no. 13 | 14,15,16,17,18,19,20,21,22,23 | 24,25,26 |  |  |
| Station no. 14 | 15,16,17,18,19,20,21,22,23,24 | 25,26 |  |  |
| Station no. 15 | 16,17,18,19,20,21,22,23,24,25 | 26 |  |  |
| Station no. 16,17,18,19,20,21,22,23,24,25 | 17,18,19,20,21,22,23,24,25,26 |  |  |  |

Fig. 4

RAILROAD TRAIN WITH LENGTH MORE THAN PLATFORM AND ITS MARSHALLING SYSTEM

CROSS-REFERENCE TO RELATED APPLICATIONS

This application is a national phase entry under 35 U.S.C. § 371 of PCT/CN2014/000795 filed on Aug. 25, 2014, which claims priority to Chinese Patent Application No. 201410377712.5 filed Aug. 4, 2014, and Chinese Patent Application No. 201410363924.8 filed Jul. 29, 2104, and Chinese Patent Application No. 201410363916.3 filed Jul. 29, 2014, and Chinese Patent Application No. 201410345278.2 filed Jul. 21, 2014, and PCT International Patent Application No. PCT/CN2014/000229 filed Mar. 10, 2014, and PCT International Patent Application No. PCT/CN2013/001011 filed Aug. 26, 2013, and Chinese Patent Application No. 201410253963.2 filed Jun. 10, 2014, and Chinese Patent Application No. 201410081947.X filed Mar. 7, 2014, and Chinese Patent Application No. 201410084479.1 filed Mar. 10, 2014, and Chinese Patent Application No. 201410253695.4 filed Jun. 10, 2014, and Chinese Patent Application No. 201410253965.1 filed Jun. 10, 2014, and Chinese Patent Application No. 201410277597.4 filed Jun. 16, 2014, and Chinese Patent Application No. 201410081948.4 filed Mar. 7, 2014, and Chinese Patent Application No. 201410081946.5 filed Mar. 7, 2014, and Chinese Patent Application No. 201410081949.9 filed Mar. 7, 2014, and Chinese Patent Application No. 201410081930.4 filed Mar. 7, 2014, and Chinese Patent Application No. 201410084472.X filed Mar. 10, 2014, and Chinese Patent Application No. 201410084477.2 filed Mar. 10, 2014, and Chinese Patent Application No. 201410084474.9 filed Mar. 10, 2014, and Chinese Patent Application No. 201410084488.0 filed Mar. 10, 2014, and Chinese Patent Application No. 201410085203.5 filed Mar. 10, 2014, and Chinese Patent Application No. 201410092645.2 filed Mar. 9, 2014, and Chinese Patent Application No. 201310374212.1 filed Aug. 26, 2013, the entirety of each of which is incorporated by this reference.

TECHNICAL FIELD

The invention relates to a kind of railroad train and its marshalling system, and more specifically, to the structure of train with length more than platform, travel method, fare collection system, railroad train signal system and advertising in tunnel.

Unless otherwise noted, the railroad trains refer to metro trains, light rail trains, maglev trains, high speed trains, inter-city light rail trains and commuter urban trains.

BACKGROUND TECHNOLOGY

Passenger traffic pressure on urban metro or light rail trains is increasing, and the rate of traffic flow and passengers in trains in rush hours have reached "saturation", resulting in a large number of passengers stranded, even to the extent of affecting safety.

Traditionally, at least three ways can be used to improve the capacity of the train which shall include the increase of dispatching frequency, the increase of train speed and the increase of the passenger capacity. However, these methods all have certain restrictions which limit the train's ability to increase its capacity more efficiently.

According to the design principles of existing metro or light rail trains, the length of the train is required to be less than or equal to that of platform section, and the length of existing metro of light rail trains in operation is indeed less than or equal to that of platform section. Therefore, for example, in case the car has already been overloaded, the increase of passenger capacity can be made possible only by increasing the number of cars of the train. However, for the current lines with heavy traffic burden such as Beijing metro line 1 and line 5, the length of the train is equal to that of the platform section and the increase of cars will inevitably cause the doors to deviate from the platform section and stop outside the platform, thus making the passengers in these cars unable to board the train quickly or even unable to board the train.

According to the current design principles, the increase of the number of the car in a train shall begin with the increase of the length of the platform. And it is the practice of Beijing metro planning. For example, the long term planning has increased the length of the platform for some lines to accommodate 8-car trains in order to improve the capacity of the train. However, to increase the length of the platform will inevitably need a large amount of civil work which will increase cost and influence the operation of the train during construction. And it is usually impossible for big cities to increase the length of the platform due to the restrictions of geographic position.

Although the Chinese patent application under the title of "station system based on the synchronous operation of station trains and passenger trains" with application number of 201310250390.3 has provided solutions for increasing the capacity of the train without changing the length of the platform, it would cause frequent connection and disconnection of station trains and passenger trains and make the trains unable to depart from the platform as the application requires other transportation carriers (refer to station trains in this application) in synchronous operation with the passenger trains for the passengers to alight from the train on the platform. Therefore, the technical scheme of this application will cost too much for platform construction and lead to lack of safety.

Therefore, the railroad train and its marshalling system which are able to safely and effectively enhance the transport capacity without changing the length of existing platform by users are required.

The existing automatic fare collection system (AFC) system includes five levels, i.e., ticket clearing and distributing central computer system, line central computer system, station computer system, station terminal equipment and ticket. However, the automatic fare collection system (AFC) system in this invention include whole road network AFC system clearing system, line central computer system, station computer system, station line equipment and ticket.

The differences between them are that, (1) the whole road network AFC system clearing system is similar to the existing ticket clearing and distributing central computer system in function, while the tickets sold by the former include the tickets with recordable riding section signs and the tickets sold by the latter do not include tickets with recordable riding section signs; (2) the station line equipment is similar to the existing station terminal equipment, while the former provides the reader which can record the riding section signs and the latter does not provide the reader which can record the riding section signs.

SUMMARY OF THE INVENTION

For this invention, a new kind of railroad train and its marshalling system are designed to solve the problems mentioned above. According to the technical proposal of this invention, the function that passengers can get on or off the platform directly from the existing cars of railroad train which are connected with door-free cars can be realized without changing the length of existing platform to safely and effectively enhance the transport capacity, and this can be achieved by adding door-free cars to the existing railroad trains and no other transportation carrier shall be used.

The invention provides a kind of train with length more than platform which is characterized in that the railroad train consists of the cars within platform area, the waiting cars connected with the cars within platform area at both ends and door-free cars;

The door-free cars which provide no side door for passengers to get on and off the train except the emergency door;

Wherein, the waiting cars are connected between the cars within platform area and door-free cars The waiting cars have doors or walls to separate the waiting section of waiting cars from the section at the station;

For the railroad trains, the statins on the whole line are divided into at least two journey sections on the basis the length of the journey; the track trains are divided into at least two riding sections which respectively correspond to one journey section with two directions (to the front and to the rear) or one direction and ensure that the most distant riding section is placed in the most distant part of the track train and the nearest riding section is placed in the center of the track train; the signs are marked for the riding sections;

The functions of the waiting cars: include the waiting section for the passengers to get off the train in the next stop for door-free cars. The passengers could board the platform directly from the waiting cars after the trains of in-station cars, waiting cars and door-free cars stop at the platform;

The waiting cars are arranged to stop within the two ends of the platform and the door-free cars are arranged to stop beyond platform area regardless of its parity;

The platform is divided into the stabling zone of the cars within platform area at the center of the platform and the stabling zone of the waiting cars within the two ends of the platform.

The total effective width of doors on one side of railroad train beyond platform area is further included, which is characterized in that: the total effective width of doors on one side of waiting cars is over 8 meters (including 8 meters);

The overlapped translational power door of railroad train beyond platform area is further included, which is characterized in that: when two adjacent side doors of one car open, the adjacent two or more door leaves will overlap the side wall.

The waiting car with the bearing column frame structure is further included, which is characterized in that: this structure consists of the beam that can be used as the handrail, the center bearing column that can be used as the handrail and/or the side bearing column that can be used as the handrail, central longitudinal sill and/or stiffening side longitudinal sill of the roof module, central longitudinal sill and/or stiffening side longitudinal sill of the undercar module;

The center bearing column and/or the side bearing column connect with central longitudinal sill and/or stiffening side longitudinal sill of the roof module and also connect with central longitudinal sill and/or stiffening side longitudinal sill of the undercar module.

The railroad train beyond platform area as claimed in claim 1; wherein the door-free cars further include transitional door-free cars which show the following characteristics: the transitional door-free cars shall have at least one partition from the longitudinal cars.

A fare collection system that is applicable to the railroad train beyond platform area will be selected, which is characterized in that the fare collection system is associated with the following content: the stations on the whole line are divided into at least two railroad sections on the basis the length of journey; the railroad trains are divided into at least two riding sections which respectively correspond to one railroad section with two directions (to the front and to the rear) and ensure that the most distant riding section is placed in the most distant part of the track train and the nearest riding section is placed in the center of the track train; the signs are marked for the riding sections;

The riding section sign is used to differentiate different riding sections; the riding section signs include all symbols, numbers and words used to indicate the riding sections;

The fare collection system sells the ticket that records the riding section signs (hereinafter referred to as the "section ticket" or "ticket").

The fare collection system sells ticket that is printed with the riding section sign and is characterized in that:

The ticket is printed with riding section sign; it belongs to one or more of the following: high-speed train ticket, normal train ticket, inter-city light rail train ticket, maglev train ticket, metro ticket and light rail train ticket.

The fare collection system further includes the ticket that can record the riding section signs and is characterized in that riding section signs can be written into the memory area of tickets; it belongs to one or more of the following:

IC card ticket: metro ticket, light rail train ticket, maglev train ticket, inter-city train ticket; non-contact city "one-card-for-all" IC card, non-contact IC card ticket; non-contact city "one-card-for-all" IC card, including PASMO ticket; non-contact IC card ticket, including CPU card ticket and M1 card ticket;

The IC card ticket includes one-way IC card ticket;

Magnetic card ticket; the magnetic card section ticket includes one-way magnetic card ticket.

One automatic fare collection system that is applicable to the fare collection system will be selected and is characterized in that:

It consists of ticket clearing and distributing central computer system, line central computer system, station computer system, station terminal equipment and ticket;

The platform between inbound ticket checking machine and outbound ticket checking machine and/or the car is installed with readers;

The riding section information between the inbound ticket checking machine and the outbound ticket checking machine is set in the readers of the platform and/or car.

Including the information between the reader and ticket; the exchanged information includes the riding section signs;

The reader communicates with automatic fare collection system and transmits the information to the automatic fare collection system to allow the outbound ticket checking machine to identify the information recorded by the ticket.

The automatic fare collection system further includes the database of the automatic fare collection system which is characterized in that: the database contains the stored riding section signs.

The automatic fare collection system further includes the ticket calculating method, which is characterized in that it contains the fare calculated according to the departing station and target station number on the ticket and the riding section signs obtained from reader between inbound ticket checking machine and outbound ticket checking machine.

The automatic fare collection system is characterized in that:

The platform between the inbound ticket checking machine and the outbound ticket checking machine and/or car is installed with reader which includes one or more of the following: magnetic card recorder and IC card reader.

The automatic fare collection system is characterized in that: the ticket has the function of recording the riding section signs.

A kind of automatic fare collection system that is applicable to the automatic fare collection system will be selected, which further includes software program and is characterized in that:

First step: the fare collection system sells the ticket that can record the riding section signs; second step: record the inbound station by swiping the ticket via inbound ticket checking machine; third step: swipe the ticket via the reader between the inbound ticket checking machine and outbound ticket checking machine, record riding section signs in the ticket; fourth step: swipe the ticket via the outbound ticket checking machine, calculate the fare from the outbound station, the inbound station written by the inbound ticket checking machine and the riding section signs recorded by the reader between the inbound ticket checking machine and the outbound ticket checking machine.

The automatic fare collection system further includes the communication mode of reader and automatic fare collection system, which is characterized in that the communication mode of reader and automatic fare collection system belongs to one or more of the following:

Off-network system, wireless communication system and wired network system; wireless communication system, including mobile communication system.

A kind of signal system that is applicable to the railroad train beyond platform area will be selected and is characterized in that:

The data train length of signal system is the length of train with length more than platform, and the length of train with length more than platform includes the length of railroad train within platform area and the length of railroad train beyond platform area;

The length of railroad train beyond platform area is the space with two ends of the platform as the limits and defined as the length of train cars outside two ends of the platform.

The signal system of railroad train beyond platform area further includes the storage unit, which is characterized in that the data train length in the storage unit is defined as the length which contains the length of railroad train beyond platform area;

The storage unit further includes one or more of the following: storage unit of the ATC system, storage unit of central controller, storage unit of ATC area controller, onboard ATC storing unit, storage unit DSU database of CBTC system, embedded database, real-time database and high speed railroad database.

The signal system of railroad train beyond platform area further includes the block system and is characterized in that the data train length in block system is defined as the length which contains the length of railroad train beyond platform area;

The block system further includes one or more of the following: fixed block system, quasi-movable block system, movable block system and virtual block system.

The signal system of railroad train beyond platform area further includes the software program of signal system, which is characterized in that the data train length in the software program is defined as the length which contains the length of railroad train beyond platform area;

The software program further includes the movement authority which shall include one or more of the following: movement authority of railroad train ATC system, movement authority limit LMA based on wireless communication CBTC system, and movement authority (MA) of high speed railroad train control system.

A kind of advertising lamp house that is applicable to the railroad train beyond platform area will be selected and is characterized in that: the advertising lamp house is set in the outside-window tunnel space corresponding to the parking position of door-free car and has the functions of advertisement and lighting.

BRIEF DESCRIPTION OF THE FIGURES

FIG. 1-2 is a diagram of waiting cars and door-free cars of a railroad train beyond a platform area stopped at one end of the platform and an inside position of platform end.

FIG. 1-3 is a diagram of train marshaling and a riding section distribution diagram of railroad train stopped at a platform.

FIG. 1-4 is a riding section distribution diagram of a railroad train having 12 cars stopped at a platform.

FIG. 2-1 is a top view of waiting cars in a bearing column frame structure for a railroad train.

FIG. 2-2 shows overlapped translational power doors of a railroad train.

FIG. 2-3 is a front view of type A metro vehicle for overlapped translational power doors.

FIG. 2-4 is a side view of type A metro vehicle for embedded overlapped translational power doors.

FIG. 3-1 is a top view of cars in a bearing column frame structure for a railroad train.

FIG. 3-2 is a top view of type A metro vehicle for a railroad train.

FIG. 3-3 is a front view of 90 degree angle vertical doors for a type A metro train.

FIG. 4 is a Preferential Price Parameter Table and Riding Section Distribution Structure.

Figure 1:
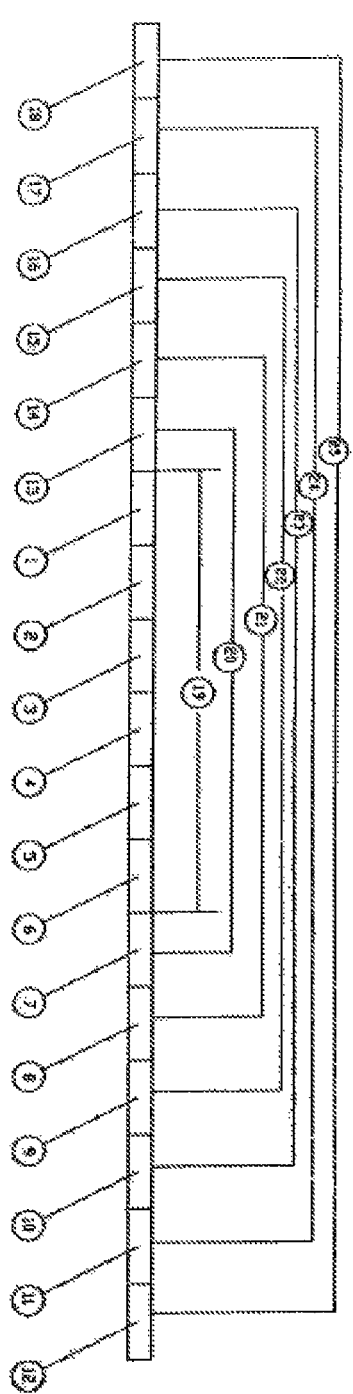
FIG. 1-1 is a ridging section distribution diagram of a railroad train stopped at a platform.

If there are 26 stations on the line, namely, station number 1, 2, 3, 4, 5, 6, 7, 8, 9, 10, 11, 12, 13, 14, 15, 16, 17, 18, 19, 20, 21, 22, 23, 24, 25, 26, and the train is with 18 cars: the diagram of railroad section—riding section—ticket color—car color (or key 0.01) for railroad train, (1) the railroad sections are divided as follows: stations 2, 3, 4, 5, 6, 7, 8, 9, 10, 11 represent the nearest railroad section with white railroad section sign; stations 12, 13, 14 represent the short-distance railroad section with blue railroad section sign; stations 15, 16, 17 represent the relatively-short-distance railroad section with cyan railroad section sign; stations 18, 19, 20 represent the mid-distance railroad section with green railroad section sign; stations 21, 22, 23 represent relatively-mid-distance railroad section with yellow railroad section sign; stations 24, 25, 26 represent long-distance railroad section with orange railroad section sign.

(2) The riding sections are divided as follows: cars 1, 2, 3, 4, 5, 6 are the existing cars in the platform and they will be changed as the waiting cars in the invention; cars 7, 8, 9, 10, 11, 12, 13, 14, 15, 16, 17, 18 are the door-free cars which are out of the platform;

Cars 2, 3, 4, 5 represent the nearest riding section with white riding section sign, white ticket color and white car color; cars 7 and 13 represent the transitional door-free car 20; cars 8 and 14 represent the short-distance riding section 21 with blue riding section sign, blue ticket color and blue car color (or key 0.01); cars 9 and 15 represent the relatively-short-distance riding section 22 with cyan ticket color and cyan car color (or key 0.02); cars 10 and 16 represent the mid-distance riding section 23 with green riding section sign, green ticket color and green car color (or key 0.03); cars 11 and 17 represent the relatively-mid-distance riding section 24 with yellow riding section sign, yellow ticket color and yellow car color (or key 0.05); car 12 and 18 represent the long-distance riding section 25 with red riding section sign, red ticket color and red car color (or key 0.06); the 19 represents the platform length;

In the standard drawing, there are 26 stations; if the number is decreased or increased, cars can be decreased or increased as appropriate; train crew will require passengers to check the tickets according to ticket colors and the passengers for mid- and long-distance travel cannot stay in the short-distance cars. At the same time, the cars shall be painted in appropriate color both inside and outside, so as to make passengers find their corresponding cars quickly and take seats; there are no seats in the waiting cars, passengers cannot stay in the cars, and tickets cannot be sold in the cars;

The "riding section distribution structure" is as follows: 6 sections: stations 2-11, white; stations 12-14, blue; stations 15-17, cyan; stations 18-20, green; stations 21-23, yellow; stations 24-26, orange; and, the riding section distribution structure can be simplified as "10-3-3-3-3-3";

The nearest, short-distance, relatively-short-distance, mid-distance, relatively-mid-distance, long-distance and longest-distance cars shall be distributed according to the passenger volume situations of local lines and the same requirements cannot be specified.

Figure 2:
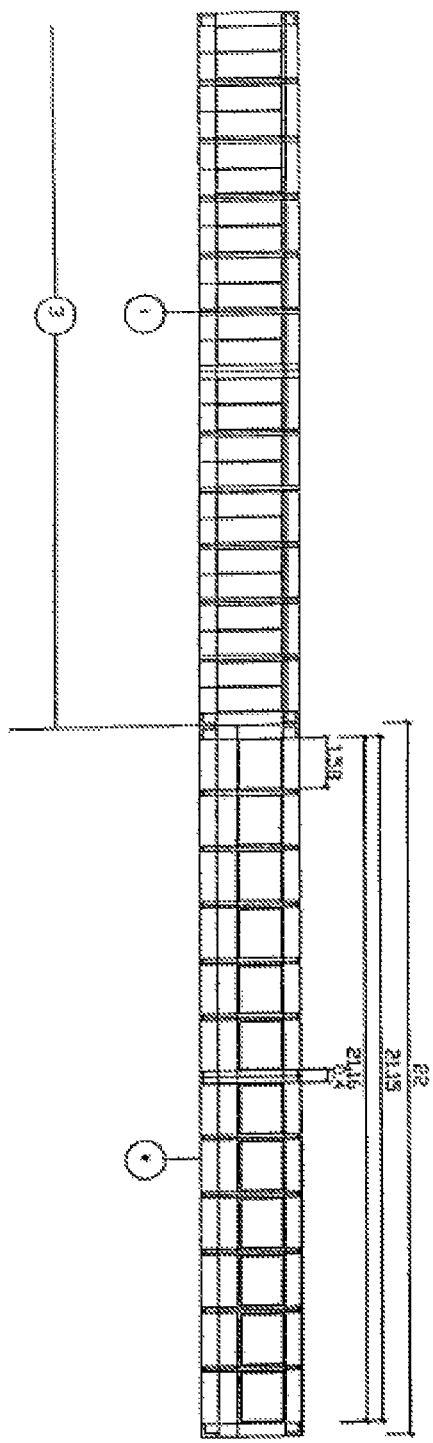

FIG. 1-2 is the standard diagram of the waiting cars and door-free cars of railroad train beyond platform area stopped at one end of platform and the inside position of platform end; 1 represents the waiting cars stopped inside the platform end, 2 represents the door-free cars stopped outside the platform end and 3 represents the inside of end; these are the most important technical characteristics.

Figures 2, 3:
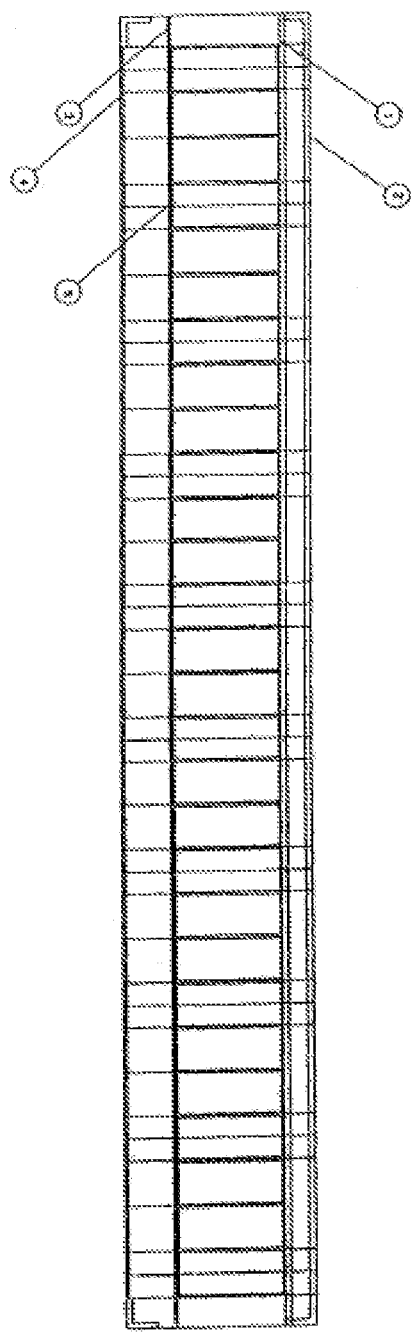

FIG. 1-3 is the diagram of train marshalling and the riding section distribution diagram of railroad train stopped at the platform: if there are 6 stations on the standard line, 36 cars will be applied; the distribution of cars is as below: cars 1, 2, 3, 4, 5, 6, 7, 8, 9, 10, 11, 12, 13, 14, 15, 16, 17, 18 are the existing cars within the length of platform; in this invention, cars 1-18 will be changed as waiting cars (i.e., half of cars will be set as waiting cars); 19, 20, 21, 22, 23, 24, 25, 26, 27, 28, 29, 30, 31, 32, 33, 34, 35, 36 are door-free cars outside the platform; due to the train is express train, cars 19-36 can be changed as sleeping cars totally; "multistep train getting-off method" (also called "differential section train getting-off method") is applied; 37 represents the length of platform.

(1) The railroad sections are divided as follows: stations 2 and 3 are the nearest railroad section with white railroad section sign; stations 4 and 5 are the short-distance railroad section with blue railroad section sign; station 6 is the long-distance railroad section with red railroad section sign;

(2) The riding sections are divided as follows: cars 7, 8, 9, 10, 11, 12 are the nearest riding section with white riding section sign and white car color; cars 2, 3, 4, 5, 6, 13, 14, 15, 16, 17 are short-distance riding section (note: this riding section stops in the station under special situations) with blue riding section sign and blue car color; cars 19, 20, 21, 22, 23, 24, 25, 26, 27, 28, 29, 30, 31, 32, 33, 34, 35, 36 are the long-distance riding section with red riding section sign and red car color;

The Car Section Distribution Structure Diagram of this line is as below: "riding section distribution structure"; 4 standard sections: stations (2-3), white—stations (4-5), blue—station (6), red; this can be simplified as 5-1 structure.

FIG. 1-4 is the riding section distribution diagram of railroad train stopped at the platform; totally 26 stations are set on the line and the railroad train consists of 12 cars;

The riding sections are divided as follows: 1, 2, 3, 4, 5, 6 are the existing cars in the platform and they will be changed as the waiting cars in the invention; cars 7, 8, 9, 10, 11, 12 are the door-free cars which are out of the platform; cars 2, 3, 4, 5 are the nearest riding section with white riding section sign and white car color; cars 7 and 10 are short-distance riding section with blue riding section sign and blue car color (note: cars 7 and 10 can also be changed as the transitional door-free cars); cars 8 and 11 are the mid-distance riding section with yellow riding section sign and yellow car color; cars 9 and 12 are the long-distance riding section with red riding section sign and red car color; 13 represents the platform length.

The stations are divided as 1, 2, 3, 4, 5, 6, 7, 8, 9, 10, 11, 12, 13, 14, 15, 16, 17, 18, 19, 20, 21, 22, 23, 24, 25, 26;

Stations 2, 3, 4, 5, 6, 7, 8, 9, 10, 11 are the corresponding riding sections of the nearest railroad section—white cars; stations 12, 13, 14, 15, 16 are the corresponding riding sections of short-distance railroad section—blue cars; stations 17, 18, 19, 20, 21 are the corresponding riding sections of mid-distance railroad section—yellow cars; stations 22, 23, 24, 25, 26 are the corresponding riding sections of longest distance railroad section-red cars;

The Car Section Distribution Structure Diagram of this line is as below: "riding section distribution structure"; 4 standard sections: stations (1-11), white—stations (12-16), blue—stations (17-21), yellow—stations (22-26), red; this can be simplified as 10-5-5-5 structure.

FIG. 2-1 is the top view of waiting cars in "bearing column frame structure" for railroad train and the top view of overlapped translational power door for cars in "bearing column frame structure" of type A metro vehicles; the length of metro car is 22 meters, the width of overlapped translational power door is 1.5 meters, the width of window is 0.75 meters and the total width of 9 doors is 13.5 meters. 1 represents the center bearing column (with handrails), 2 represents the side bearing column (with handrails), which includes the solid center bearing column and side bearing column with the function of supporting and strengthening for retaining the tensile strength and torsional strength, 3 represents the door frame, 4 represents the gangway, 5 represents the central longitudinal sill added; if the beam is on the roof, it is the roof central longitudinal sill and its vertical counterpart is the undercar central longitudinal sill which is connected by center bearing column; 6 represents a door set at the gangway which is used to get to the original cars in platform; when the railroad train is running, the door is closed; 7 represents the reinforced column of door post; 8 represents the roof cross beam or undercar cross beam which is connected by the side bearing column, and it will functioned with the reinforced column of door post and stiffening side longitudinal sill to form a circular support frame, so as to realize the lateral strengthening of whole car door structure; 9 represents the stiffening side longitudinal sill added;

if the beam is on the roof, it is the roof central longitudinal sill and its vertical counterpart is the undercar central longitudinal sill which is connected by center bearing column; the side door frame has two vertical reinforced columns which are welded with the roof stiffening beam. The door body structure consists of center bearing column, side bearing column, undercar stiffening beam, roof stiffening beam and bolted connection. Thus, the cars will be strengthened wholly so as to compensate the decrease of tensile strength and torsional force of cars for door widening.

FIG. 2-2 shows the overlapped translational power door of railroad train; the embedded and exposed overlapped translational power doors are arranged with the car side wall as the centerline, such as embedded overlapped translational power door-car side wall-exposed overlapped translational power door; as the top view of type A metro vehicle shows, 1 and 2 represent the exposed overlapped translational power doors; 3 and 4 represent the embedded overlapped translational power doors, and 1, 2, 3 and 4 form the structure of embedded overlapped translational power door—car side wall—exposed overlapped translational power door; the car side wall is between 2 and 3, and 5 represents the door closing status. The combination of embedded and exposed overlapped translational power doors makes the total opening width of translational door reach the maximum width of translational power door.

FIG. 2-3 is the front view of type A metro vehicle for overlapped translational power door of railroad train; 1 represents strengthened transverse bar for upper frame of car side door with the function of strengthening the upper door frame and compensating the decrease of tensile strength and torsional force of cars lack of side wall; the cross beam and longitudinal sill handrails are set at the side support pillars and center support pillars; 2 represents the roof longitudinal sill; 3 represents the car bottom plate; 4 represents the undercar longitudinal sill and 5 represents the undercar cross beam.

Figures 2, 3, 4:
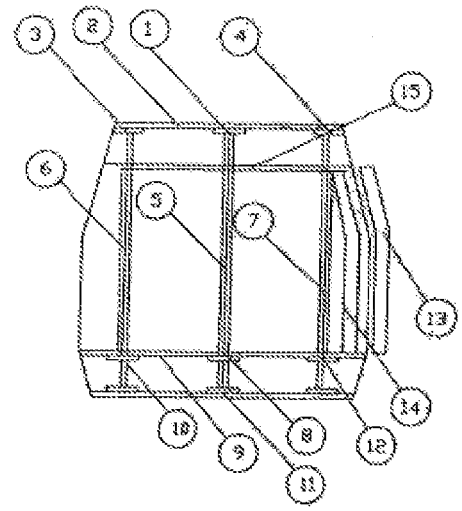
Figure 3:
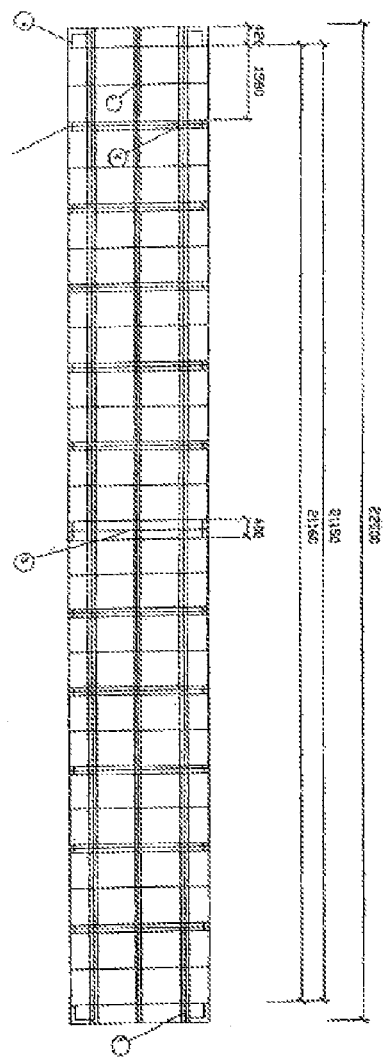
Figure 1:
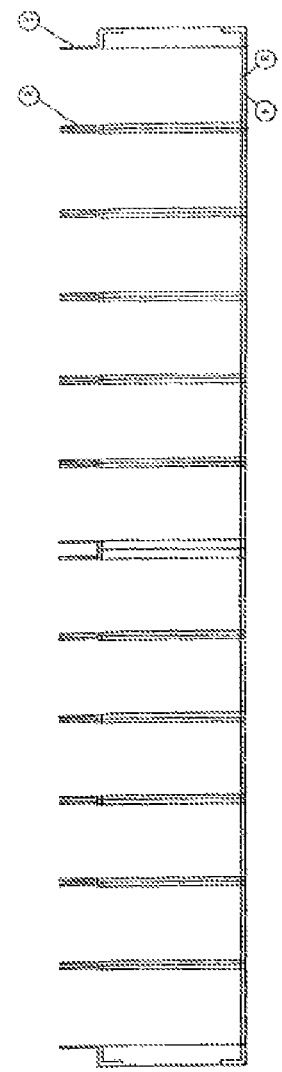
Figure 2:
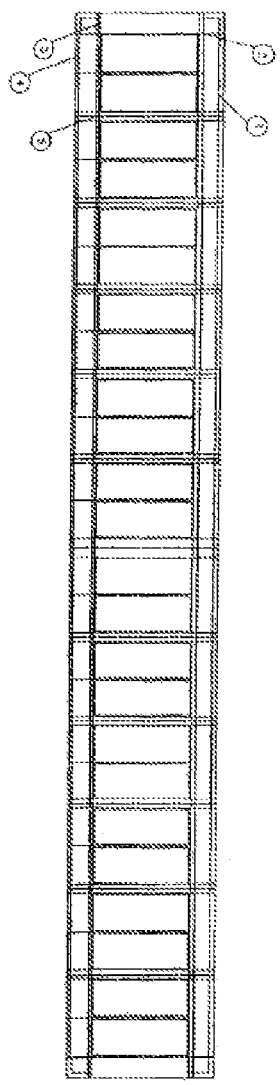

FIG. 2-4 is the side view of type A metro vehicle for embedded overlapped translational power door-car side wall-exposed overlapped translational power door of railroad train; 1 represents the roof center longitudinal sill; 2 represents the roof stiffening cross beam; 3 and 4 represent the roof stiffening cross beam added; 5 represents the center bearing column (with handrails); 6 and 7 represent the side bearing column (with handrails); 8 represents the undercar center supporting beam; 9 represents the car bottom plate; 10 and 12 represent the undercar stiffening side longitudinal sill; 11 represents the undercar center longitudinal sill added; 13 represents the exposed door leaf of overlapped translational power door; 14 represents the embedded door leaf of overlapped translational power door and 15 represents the cross beam handrails.

FIG. 3-1 is the top view of cars in bearing column frame structure for railroad train, which relates to a kind of parallel post-type vertical power door; for the parallel post-type vertical power door, the structure diagram of car strengthening with 90° vertical shaft door will be provided; the width of door frame is 1.76 meters; the width of door post (embedded) is 0.18 meters; the total number of doors is 12 and the total width of door frame is 21.12 meters. 1 represents the center bearing column; 2 represents the side bearing column which is welded with the undercar beam and roof stiffening beam for strengthening of the while car structure; 3 represents the side door frame which is welded with the 10×20 cm reinforced column and roof stiffening beam, and also welded with the undercar cross beam to form a circular support frame and strengthen the whole car, so as to compensate the decrease of tensile strength and torsional force of cars for door widening. 4 represents the 50×50×1 cm reinforced aluminum alloy at four corners of car; 5 represents the 40×2 cm stiffening beam welded with reinforced side column at the middle of car; 6 represents the 20×1 cm roof stiffening longitudinal sill, and its vertical counterpart is 20×2 cm undercar stiffening longitudinal sill. (This car structure is also applied to the waiting cars of trains (including two layers), EMUs and high-speed trains, and the doors will be increased accordingly; the advantage is that the width of door is larger.)

FIG. 3-2 is the top view of type A metro vehicle for railroad train and the top view of car with parallel post-type vertical power door; 1 and 2 represents the vertical pivot outward-opening door; 3 and 4 represents the status of door opening; the door frame is contained and two adjacent door posts are joined.

FIG. 3-3 is the front view of parallel post-type 90° vertical shaft door of type A metro vehicle for railroad train; 1 represents the roof beam; 2 represents the 20×1.5 cm side strengthening bar; 2 represents the cross beam and longitudinal sill at the center bearing column, side bearing column; 3 represents the car bottom plate; 4 represents the undercar side longitudinal sill; 5 represents the 90° vertical shaft door.

FIG. 4 is the Preferential Price Parameter Table and Riding Section Distribution Structure; take the automatic fare collecting AFC system for railroad train as the example:

Such as, for Beijing Metro Line 1, there are 26 stations on the line and 4 railroad sections; the ticket price for passengers in stations 2-11 are the original price; the ticket price for passengers in stations 12 and subsequent stations is the preferential price, which is divided into two options:

(1) The preferential price is specified as follows: for stations 12-16, the reduced cost is 0.50 Yuan; for stations 17-21, the reduced cost is 1.00 Yuan; for stations 22-26, the reduced cost is 1.50 Yuan;

(2) The preferential price is "80% discount of ticket price"; for stations 12-16, the 80% discount of ticket price is 0.40 Yuan; for stations 17-21, the 80% discount of ticket price is 0.8 Yuan; for stations 22-26, the 80% discount of ticket price is 1.10 Yuan;

There are two options for preferential price: (1) select any one from the two options; (2) select both;

For both are selected, if the line is with multiple card swiping, such as 4 times, 4 times card swiping shall be swiped; if the passenger only swipes 3 times, then calculate according to 80% discount of ticket price.

The specific format specification of FIG. 4 Preferential Price Parameter Table and Riding Section Distribution Structure is as follows:

1. The first row "Riding Section Distribution Structure 10 white-5 blue-5 yellow-5 red cars" shows that the riding section distribution structure of 4 riding sections is 10 white-5 blue-5 yellow-5 red cars, which is an artificial rule of Beijing Metro Line 1;

2. "Station Number" in the column represents the station number specified according to the train running direction from the top down and the station number changes in order, such as Station 1—Station 15—Station 26;

3. "White Riding Section" in the column represents the white riding sections specified according to the train running direction from the top down and the station number changes in order;

4. "Blue Riding Section" in the column represents the blue riding sections specified according to the train running direction from the top down and the station number changes in order;

5. "Yellow Riding Section" in the column represents the yellow riding sections specified according to the train running direction from the top down and the station number changes in order;

6. "Red Riding Section" in the column represents the red riding sections specified according to the train running direction from the top down and the station number changes in order;

7. The electronic display for guide map of riding sections (hereinafter referred to as the "display"): the station number is specified according to the train running direction from the top down and the station number changes in order;

The readers include those with LED lights; the color of LED lights matches with that of corresponding riding section to make passengers swipe cards easily; thus, passengers can get into their corresponding cars according to the guide map electronic display and swipe cards in the readers;

8. "Original Ticket Price" in row refers to the seat ticket price of cars in platform;

9. "Discounted Ticket Price" in row refers to the preferential price of seats in door-free cars outside platform; the actual ticket price=original ticket price−discounted ticket price;

10. "80% Discount of Ticket Price" in row refers to the preferential price of seats in door-free cars outside platform; the actual ticket price=original ticket price−80% discount of ticket price; and, the "80% discount of ticket price" means "discounted ticket price"×80%=0.5 Yuan×80%=0.40 Yuan; 1.00 Yuan×80%=0.80; 1.50×80%=1.10 Yuan.

DESCRIPTION OF PREFERRED EMBODIMENTS

In structure, the door-free cars are characterized in that passengers will not get on or off from these cars and these cars will stop outside platform; the waiting cars are characterized in that they are connected with door-free cars and stop inside platform; the train with length more than platform includes the waiting cars which are connected with door-free cars and includes no other transportation carriers and coupled cars for assisting passengers to get on or off the platform; passengers can get to the platform directly from the waiting cars which are connected with door-free cars.

Preferably, "the marshalling of train with length more than platform" is a new kind of travel mode, and in method, the length of railroad train can be increased at one end or both by at least one door-free car (including riding by differentiating railroad sections) to stop outside platform without changing the length of existing platform, and the passengers in the car can get into the waiting car one stop early through gangway and get off the train without the help of any transportation carriers after the waiting cars, door-free cars and the whole train get to and stop at the platform simultaneously.

Preferably, to implement the invention, the train with length more than platform is designed and its technical characteristics in structure are as follows:

The door-free car by which the length of railroad train can be increased at one end or both is invented, and at least one door-free car can be added to stop outside platform with being connected with waiting cars; the door-free car is with no side door except the emergency door; it is a part of the train with length more than platform;

Preferably, the invention is a new kind of train marshalling; the length of railroad train can be increased at one end or both end of an existing train by at least one door-free car to stop outside platform without changing the length of existing platform, and the passengers in the car can get into the waiting car one stop early through gangway and get off the train without the help of any transportation carriers after the waiting cars and the whole train get to and stop at the platform simultaneously; the invention of "train with length more than platform marshalling passenger transport system" (in structure) is realized by adding door-free cars (connected with waiting cars) at both ends of train inside the platform according to the railroad sections;

Preferably, the invention relates to a new method for railroad train marshalling, ticketing, travel method and ticket checking; the traction substation system capacitor, contact wire cross-sectional area and tunnel lighting system for rail, signal, metro and light rail trains will be added accordingly. This changed the existing railroad train marshalling passenger transport system and invented the new train marshalling by connecting waiting cars and door-free cars (unless otherwise specifically specified in the invention, the door-free cars refer to those for passenger cars); the length of railroad train can be increased at one end or both by at least one door-free car (including riding by differentiating railroad sections) to stop outside platform without changing the length of existing platform, and the passengers in the car can get into the waiting car one stop early through gangway and get off the train without the help of any transportation carriers after the waiting cars, door-free cars and the whole train get to and stop at the platform simultaneously; the invention is a new kind of train marshalling in structure, and the dynamic marshalling of train can be realized by adding door-free cars (connected with waiting cars) at both ends of train inside the platform and the passengers in the car can get into the door-free cars one through gangway according to the method of "riding by differentiating railroad sections"; to safely and effectively enhance the transport capacity, the technological breakthrough is the invention of train with length more than platform; the platform positions of railroad train are shown in FIGS. 1-1 and 1-2; during the running of train, make the passengers in the car get into the waiting car one stop early and then get off the train to the platform when the train stops; thus, passengers in the cars outside platform can safely and quickly get off to the platform without changing the length of platform and car;

The technical characteristics of this invention are the creation of train marshalling by connection the waiting cars with door-free cars, the creation of waiting cars for railroad train and the creation of door-free cars for railroad train;

It shall be noted that: the length of platform in different countries is different and the platform in China can accommodate a maximum of 8 cars; thus, the length of train beyond platform area is the space with two ends of the platform as the limits, not simply for the quantity of cars and it refers in particular to the train length out of two ends of platform, i.e., one or more door-free cars out of two ends of the platform; individual platform can accommodate 18 cars; as long as the 18 cars are within the limits of platform, there are no train beyond platform area, thus the train shall not be considered as with the ATC system of train with length more than platform; some platforms can accommodate a maximum of 6 cars; the 7th car or subsequent cars are the cars beyond platform area; thus, the train shall be considered as with the ATC system of train with length more than platform;

The door-free cars are characterized in that there are no side door for passengers to get on and off the train except the emergency door and these cars will stop outside platform; foot treadle or ladder for passengers to get on and off shall be set at the corresponding car floor of emergency door; the foot treadle is divided into withdrawal type and apparent withdrawal type; for the withdrawal type foot treadle, the foot treadle is usually folded under car and in emergency, it will be unfolded to make passengers get off by using the foot treadle; the foot treadle can also be provided with two sections, such as the retractable foot treadle for bus, to let passengers get off;

The waiting cars are characterized in that they stop inside the platform and are connected with door-free cars which are outside the platform;

Train with length more than platform consists of at least one door-free car outside the platform which is connected with waiting cars; the number of door-free cars can be selected according to the passenger volume; the cars without side door for passengers get on or off is called the door-free cars which is connected with the waiting cars for passengers to get on or off during stopping; the door-free cars can be provided with emergency doors; according to the existing technology, the length of train can be added with cars beyond platform area to resolve the technical problem for passengers in cars beyond platform area to safely get on or off within 1 minute;

By adding the door-free cars, the problem of insufficient seating space for cars within platform area is resolved;

By adding the waiting cars, the problem of getting on or off within short time is resolved;

Technical characteristics of the train with length more than platform (in structure) are as follows:

(1) The waiting cars are specially used for passengers in other cars to get on or off the train concentratedly;

(2) The waiting cars stop inside the platform;

(3) The door-free cars are invented and there are no side door for passengers to get on or off in structure (excluding emergency or access doors);

(4) The door-free cars stop outside the platform;

(5) The passengers in the cars must be get off from other cars totally;

(6) The door-free cars are connected with waiting cars through gangway;

(8) The waiting cars, door-free cars and the whole train get to and stop at the platform simultaneously;

(9) The traction substation system capacitor, contact wire cross-sectional area and tunnel lighting system for rail, signal, metro and light rail trains will be added accordingly.

Effect of the invention lies in that, the riding comfort is increased significantly for the double of car capacity and the passenger volume increases at least by 1 time. At the same time, the riding comfort will be increased significantly.

Preferably, the waiting cars are specially designed for passengers to get on or off and there are no seats in the cars; the separate riding method for passengers who get off at the next stop and passengers who do not get off at the next stop is invented.

Preferably, the door-free cars for railroad train has changed the method of getting off only from respective cars for passengers and the mode of each car with side doors for getting on or off; with the creation of door-free cars without side door, passengers must get off from other cars and the capacity is increased by realizing the mobility of people.

Preferably, the door-free cars for railroad train has changed the habit of mixing riding for passengers and the method of riding according to the railroad sections is created, so as to make the passengers in the same railroad section take the same car and reduce the interference of long-distance passengers to short-distance passengers.

(1) The transitional door-free cars can also be added between the door-free cars and waiting cars, so as to make passengers to pass the transitional door-free cars from waiting cars and ease traffic congestion; transitional door-free cars are provided with no seats and only two walks are provided for passengers; the passengers are forbidden to stay in the cars; the longitudinal bars are set at the middle of cars to separate on and off passengers with one walk for getting on and one for getting off, thus the traffic congestion can be eased; the "two-way door with single leaf" is provided at the longitudinal bar; only when the waiting cars are empty, the one-way door for getting in the door-free car will be closed and the door for getting in the waiting car will be opened, and vice versa; at this time, there are personnel stand at the one third of waiting car which is close to the door-free car to supervise, so as to ensure that passengers to get on can get in the door-free car immediately;

(2) The transitional door-free cars with two-way automatic sidewalk can be added between the waiting cars and transitional door-free cars, which provide no seats; the chain or belt type automatic sidewalk can be applied with longitudinal bars at the middle of cars to separate on and off passengers with one walk for getting on and one for getting off, and the "two-way door with single leaf" is provided at the longitudinal between two-day sidewalk and the waiting car;

(3) At least one "two-way door" shall be provided between the transitional door-free car or door-free car and the waiting car, including the overlapped translational door; the "anti-crowd program" is set for the door; if one door opens, another door must be closed or two doors shall be closed at the same time, so as to control the passenger flow and prevent congestion; a door can be set at left side for passengers to get in the waiting car from the transitional door-free car; a door can be set at right side for passengers to get in the transitional door-free car from the waiting car; the anti-crowd program for overlapped door is as follows:

1) After all passengers get on the train, the doors for waiting cars will be closed; when the train starts to run, the right doors will be opened and passengers can get in the transitional door-free car from the waiting car;

2) After all passengers get in the transitional door-free cars, the right doors will be closed and the left doors will be opened, and passengers can get in the waiting car from the transitional door-free car;

3) For waiting cars, the gangway at the inner side of car is replaced by a wall and the longitudinal detectors are set every 20 cm at the height of about 1 m which is equal to the waist high; the detectors include infrared distance detector and thermal distance detector; the longitudinal detectors point to the direction of right door close and left door open; the transverse detectors are set at the position of left door open for transitional door-free car; the longitudinal and transverse detectors will complete the detection of cars together, such as, if any passengers stay within 1 minute, broadcast or switch on the red light to supervise passengers to get in the transitional door-free car; for some old people, children and patients stand in the cars within platform area, passengers will quickly get in the transitional door-free cars and after getting in, the left doors will be closed and the right doors will be opened;

4) All passengers will get in the waiting cars from transitional door-free cars; to prevent congestion, the left doors will be closed, the train stop, the doors for waiting cars will be opened and passengers get off the train;

5) Then, passengers getting on the train; to prevent congestion, the left doors are closed and the right doors are opened.

(4) The travel method of train: the door-free cars can be changed as the sleeping cars, so as to improve the riding comfort significantly.

Preferably, the waiting cars of railroad train are changed from seating cars in function and nature, which can also be called "moveable platform"; these cars are without seats and tickets; when there are many passengers, the train can be added with several cars at the front and rear end with the total number of cars getting to more than 12; the gangway used for connection of waiting cars and cars within platform area can be set with a door, so as to facilitate the management of passengers in waiting cars, door-free cars and cars within platform area; during operation, the door is closed to prevent mobility of passengers in waiting cars and cars within platform area, so as to ensure that there is no passenger who will not get off at the next station; when the train is not in operation, the door can be used for cleaning and maintenance.

Preferably, to make passengers get off freely from waiting cars, the existing width of door shall be maximized without the change of tensile strength and torsional strength of cars and the change of existing length of cars; at the same time, the length of car can be approached as much as possible, i.e., achieve the maximum length without side wall and the total width of door is increased significantly compared to the existing width of door; for type A metro vehicle, 8 meter in one side will be increased and the length of car can be approached as much as possible.

Preferably, for lines with less passengers, the waiting cars can be designed as half of waiting car and half of original car to realize the dynamic marshalling; for lines with more passengers, two waiting cars can be coupled. The waiting cars are composed of two parts: one part for waiting section of waiting cars; and another part is for in-station section of waiting cars.

Preferably, the door-free cars are invented, namely, the doors of existing cars will be removed and changed as windows; the door-free cars are provided with no side door except the emergency door.

Preferably, in the invention, the mixing method of short-, mid- and long-distance travel is changed as the method of "riding by differentiating railroad sections";

Preferably, FIG. 2-2 shows the door opening mode 1 of waiting cars, and the overlapped translational power door is invented—when two adjacent side doors of one car open, the adjacent two door leaves will overlap the side wall, which is as follows:

Preferably, when two adjacent side doors of one car open, the adjacent two door leaves will nearly overlap; after the opening of two adjacent side doors of cars, the adjacent two door leaves will overlap the side wall, or 2 overlap the doors above; the overlapped modes include the internal sliding plug door overlaps the power-operated door, external sliding plug door overlaps the power-operated door, embedded door overlaps the power-operated door, external swing door overlaps the power-operated door, external sliding door overlaps the power-operated door, etc., and these modes are selected and matched mutually:

(1) The embedded and exposed overlapped translational power doors are arranged with the car side wall as the centerline;

Embedded door and external sliding plug door overlap the power-operated door;

Embedded door and external sliding door overlap the power-operated door;

Embedded door and external swing door overlap the power-operated door;

Internal sliding plug power door and external sliding plug door overlap the power-operated door;

Internal sliding plug power door and external sliding door overlap the power-operated door;

Internal sliding plug power door and external sliding door overlap the power-operated door.

(2) Take the side door as the exposed and further exposed overlapped transitional power door in the most inside layer;

External sliding plug power door and further exposed sliding plug door overlap the power-operated door;

External sliding plug power door and further exposed external swing door overlap the power-operated door;

External sliding plug power door and further exposed external sliding door overlap the power-operated door;

External swing door and further exposed external swing power door;

External swing door and further exposed external sliding door overlap the power-operated door;

External sliding door and further exposed external sliding door overlap the power-operated door.

(3) Take the side door as the embedded and further embedded overlapped transitional power door in the most outside layer;

Internal sliding plug power door and internal sliding plug door overlap the power-operated door;

Embedded door and embedded overlapped door overlap the power-operated door;

Internal sliding plug and embedded door overlap the power-operated door.

When different types of overlapped doors are used in the same trainset, the same electric control controlling system will be applied, namely, jointly use the same electric control electric door controlling system; or when the same electric control pneumatic door controlling system is applied, it shall match with the electric controlling system for cars within platform area and be connected with train automatic control unit in cab.

Preferably, FIG. 3-2 shows the door opening mode 2 of waiting cars, and the parallel post-type power door for railroad train is invented, which is characterized in that there is no side wall for car; parallel post-type power door—the door posts of two adjacent side doors are in parallel, or the status of car without side wall can be achieved; when the door leaf opens, it is vertical to the car; the external swing door opening type of existing metro (or bus) is used; the door opening angle can ensure that the door leaf is vertical to the car side wall to attain the maximum door opening net width;

When the door leaf opens outward, use the external swing door of existing metro to adjust the length of upper and lower bending arms and location of rotating shaft and adjust the length of upper and lower hinges of door leaf; to ensure the matchup of length of upper and lower bending arm of door leaf and rotating shaft position and length of upper and lower hinges of door leaf and rotating shaft position and door leaf edge to ensure that the door leaf is vertical to the car when the door leaf is fully opened;

Preferably, FIG. 2-2 shows one door opening mode of waiting cars for type A metro vehicle and it is applicable to the overlapped translational power door with the same embedded overlapped translational power door—window—exposed overlapped translational power door.

Preferably, 20×3 cm strengthening bar will be added on the door frame of each car of railroad train, and the strengthening bar with the same length will be added at both sides symmetrically to increase the car strength; as shown in FIG. 2-3, 2 represents the strengthening bar on the door frame.

Preferably, the central longitudinal sill and side longitudinal sill are also added at the top and bottom of car for railroad train; as shown in FIG. 2-1, the vertical line 5 represents the central longitudinal sill at the top and bottom of car, and the vertical line 9 represents the side longitudinal sill at the top and bottom of car.

Preferably, the original horizontal handrails for cars will be changed as the solid longitudinal sill and cross beam for reinforced bearing column; as shown in FIG. 2-1, 2-3 represents the solid cross beam and 2-6 represents the solid longitudinal sill.

Preferably, when the electric control pneumatic door or electric control electric door controlling system is applied, it shall match with the electric controlling system for cars within platform area.

Preferably, the doors for metro train can be divided as below according to the opening mode: embedded door, external sliding door, internal sliding plug door, external sliding plug door and external swing door, which can be used for all waiting cars of railroad train.

Preferably, the parallel post-type transverse power door for railroad train and double-decked light rail train can be applied—the door posts of two adjacent side doors are laced vertically and in parallel to attain the maximum door opening net width;

The door leaf driving system applies the driving system for external swing door of bus;

The locking system of door leaf for parallel post-type transverse power door applies the locking system for external swing door of bus;

The door pivot is at the top of car roof and shall not be close to the traction line, so as to reduce the distance from door bottom rail to side wall of car during opening;

Preferably, the structure of parallel post-type transverse power door is realized by connecting the existing external swing door system of bus (door suspension and steering mechanism, door driving device, left and right door leaf, emergency unlocking device, crew key switch sealing profile, etc.) with the existing electronic door control unit (or pneumatic control unit) for railroad train and double-decked light rail train, electrical connection, various travel switches for monitoring and electrical or pneumatic components such as indicators (i.e., apply the electronically-controlled electric door control system for railroad train and double-decked light rail train, or apply the electronically-controlled pneumatic door control system for railroad train and double-decked light rail train; apply the drive cylinder, mechanical transmission system of door control solenoid valve and travel switch for existing railroad train and double-decked light rail train, and the electric control system shall be the same as that for existing railroad train and double-decked light rail train; the locking system for car doors of existing railroad train and double-decked light rail train shall be the same as that for embedded door; the train integrated management system of existing railroad train and double-decked light rail train can be applied in cab).

Preferably, the total number of doors on one side for cars of railroad train shall be increased from maximum 5 to more than 6.

Preferably, the track between "Y" turnouts at both ends of the whole line for train (including the track between "Y" turnouts at both ends of marshalling station and place before platform) shall be lengthened, so as to make the train can run freely on other tracks; the track at the end of "Y" turnout for the starting and terminal station and the track at the end of "Y" turnout for the turning point shall be lengthened accordingly, so as to make the length of added track is slightly longer than that of add cars; the purpose is to make train get in the station without making the head or tail of train stay outside the "Y" turnouts at both ends of platform, or the running of train on other tracks will be interfered; the requirement that the length of added track is slightly longer than that of add cars shall be met.

Preferably, due to the length of car for railroad train is increased, the traction power is required to increase for 1-2 times, and the capacity and number of traction substations shall be increased for 1-2 times accordingly; the sectional area of overhead line will be increased from 120 $mm^2$ to more than 120 $mm^2$; the sectional area of auxiliary feeder will be increased from 150 $mm^2$ to more than 150 $mm^2$.

Preferably, to reduce the congestion of long railroad train, the method of "riding by differentiating railroad sections" for passengers is invented;

1) The whole line will be divided into several continuous "railroad sections" in due course, and for the train with length more than platform, several continuous riding sections will be divided from the center position in one or two directions according to the "railroad sections"; the longest riding section shall be arranged at the farthest end of train with length more than platform and the nearest riding section shall be arranged at the middle of the whole train;

2) To differentiate different riding section, the riding section sign corresponding to each riding section is applied; the riding section signs include all symbols, numbers, words and keys that are used to indicate the "riding sections";

3) The station ticket selling system sells the section ticket printed with corresponding riding section signs in accordance with passenger inbound station and destination station; the tickets with riding section signs consist of ticket price and passenger section signs;

4) For station ticket selling system with IC card tickets, the tickets which can record "riding section" signs (including IC card) can be sold according to the destinations of passengers;

5) Passengers shall get in the corresponding riding sections with tickets printed with "riding section" signs or which can record the "riding section" signs (including IC card);

The invention relates to the method of ticketing, travel method and ticket checking according to the division of railroad sections (at least two sections) in nearest, short, medium and long (or short, relatively-short, medium, relatively-medium, long and longest) distance, which referred to as the method of "riding by differentiating railroad sections"; namely, the passengers for nearest distance can sit in the cars within platform area with the old, patients, pregnant women and passengers with infants; the passengers for longer distance can sit in the door-free cars which will be divided into different sections according to short, relatively-short, medium, relatively-medium, long and longest distance railroad sections; the tickets with corresponding colors will be sold at the station and passengers shall get into corresponding cars according to the colors of tickets. The tickets are printed with different colors (the colors are only used for marking and can be agreed upon), and the former ticket with white background color is changed; only one rectangle white box is present in the middle of the ticket where the destination is printed; the cars are classified into short-distance car (blue ticket and blue car color), relatively-short-distance car (cyan ticket and cyan car color), mid-distance car (green ticket and green car color), relatively-mid-distance car (yellow ticket and yellow car color), long-distance car (orange ticket and orange car color) and longest-journey car (red ticket and red car color); these colors are painted inside and outside of the cars in order; the passengers gets in cars according to the corresponding ticket color; The purpose is to prevent congestion in the door-free cars; the mixing riding for passengers is changed and the riding method according to the nearest, short, medium and long riding sections is applied; the method of "riding by differentiating railroad sections" is invented, which specifies that: divide the whole line into several continuous "railroad sections" (or referred to as "railroad sections") in due course: nearest, short, medium and long distance sections in accordance with the sequence of the stations from near to far along the moving direction of the train; and for the train with length more than platform, several continuous riding sections will be divided from the center position in one or two directions according to the "railroad sections"; the longest riding section shall be arranged at the farthest end of train with length more than platform and the nearest riding section shall be arranged at the middle of the whole train; the number of sections is divided based on the passenger volume on the whole line and the car composition of train; The "riding section distribution structure" is determined in accordance with the number of stations of each "section" and the marshaling sequence from near to far; the Preferential Price Parameter Table and Riding Section Distribution Structure of the train on this line is determined based on the above; and, the railroad section and corresponding riding section signs shall be determined accordingly; for station ticket selling system, several "railroad sections" will be divided according to the nearest, short, medium and long distance sections with the inbound station as the original point and the corresponding section tickets will be sold based on the relevant railroad sections to which the passenger destinations belong; the "ticket selling and checking program for respective riding" will be used as the hardware for "riding by differentiating railroad sections"; The station ticket selling system sells the "section tickets" (the "section tickets" in the invention include non-contact IC card, smart card (also called "IC" card), non-contact city "one-card-for-all" IC card, CPU card, M1 card, magnetic card, PASMO, single trip ticket (including thin non-contact IC card), etc.) and installs the readers (the readers in the invention include the intelligent card reader that introduces the radio frequency identification technology, CPU card reader, M1 card reader, magnetic card reader, etc.) in cars with IC card tickets for ticket selling and checking; the "ticket selling and checking program for respective riding" consists of the "section ticket selling program" and "ticket checking program for respective riding";

Specific method:

(1) "Sections" refers to several continuous station group sections (hereinafter referred to as "railroad section"): nearest, short, medium and long station group sections (or divided into short, shorter, medium, relatively medium, far and farthest station group sections) divided in the whole line in accordance with the sequence of the stations from near to far along the moving direction of the track train into; the stations on the whole line shall be divided into at least two sections (for easy description of the claim, they are divided into 4 sections: near, short, medium, far); the station number is the order number of one station on the whole line.

(2) Passenger "railroad sections" refers to several continuous "railroad sections" or station group sections divided from the stations of the whole line in accordance with the order from near to far along the moving direction of track train (the passenger inbound station is considered as the original point); the railroad section containing the passenger target station is the passenger railroad section;

(3) The railroad section signs are used to differentiate the railroad sections; the symbols, numbers, words, colors and encryption keys are temporarily used as the railroad section signs of the invention; the railroad section signs are all symbols, numbers, words, colors and encryption keys used to indicate "railroad section"; in the journey, the passenger firstly confirms the passenger's railroad section signs (that is to say the passenger railroad section signing color) and then goes into the proper riding section in accordance with the railroad section signing color;

(4) "Riding section" means to divide the whole train into several continuous riding sections from near to far from the center of the trainset to the front end and rear end (or in one direction); each riding section corresponds to one railroad section; the riding section for the farthest journey is located at the most end of the trainset, while the riding section for the nearest journey is located in the middle of the whole trainset; for the single direction train with only one direction, the riding section for the farthest journey is located at the most end of the trainset;

(5) The riding section sign is used to differentiate different riding section (for easy description of the Claims, the riding section signs are marked and arranged in the order of nearest, short, medium and far in this Claim; temporarily appointed sign colors are white, blue, yellow and red, etc.); each riding section sign corresponds to one railroad section; the riding section signs include all symbols, numbers, words colors and cryptographic keys that are used to indicate the "riding section";

(6) The "riding section distribution structure" is determined in accordance with the number of stations of each "section" and the marshaling sequence from near to far; the Preferential Price Parameter Table and Riding Section Distribution Structure of the train on this line is determined in accordance with the above factor and the preferential price parameter (hereinto, the preferential price and the preferential margin are determined in accordance with market price fluctuation); "riding section distribution structure" is one of the operating rules of the fare collection system that consists of station ticketing system, outbound ticket checking machine, station ticket checking system AFC equipment, station computer system and central computer; station ticketing system, that is to say that the hardware consisting of outbound ticket checking machine, station ticket checking system AFC equipment, station computer system and central computer operates in accordance with the "riding section distribution structure" rule to ensure the implementation of "riding by differentiating railroad sections" method;

(7) The real-time rolling information of the waiting car and door-free car is set in accordance with the Inbound Station-Outbound Station-Riding Section Guiding Chart Electronic Display determined in accordance with Preferential Price Parameter Table and Riding Section Distribution Structure; the passenger rides the train in accordance with the "riding section" sign color of the passenger's "railroad section" shown on the Inbound Station-Outbound Station-Riding Section Guiding Chart Electronic Display; the Real-Time Railroad section Sign Color Guiding Table prepared in accordance with Preferential Price Parameter Table and Riding Section Distribution Structure is placed on the train wall to allow the passengers to view the sign color of its own riding section;

(8) The passenger goes to the riding section corresponding to the railroad section of its destination when he/she gets on the train; that is to say that the "Riding on the basis of length of journey" method requires: passenger riding section (section sign color of the car)=passenger railroad section (railroad section sign color)=passenger's outbound station number−passenger's inbound station number (determined in accordance with Preferential Price Parameter Table and Riding Section Distribution Structure);

(9) The "section ticket" is sold through the station ticketing system; the "section ticket" is the ticket that is printed with the car section sign or the ticket that can be recorded with riding section sign; the passenger goes to its own riding section in accordance with the section ticket that is marked with riding section sign; the IC card section tickets of the metro and light rail vehicle is one kind of "section ticket" that can be recorded with riding section signs;

(10) The ticket checking system checks the passenger's inbound station and outbound station and conducts the ticket checking program in accordance with Preferential Price Parameter Table and Riding Section Distribution Structure;

(11) The "Riding on the basis of length of journey" method specifies the Preferential Price Parameter Table and Riding Section Distribution Structure; that is to say, it specifies the one-by-one corresponding relation between "passenger's railroad section sign (symbol or color), riding section sign (symbol or color), ticket color, paint color inside and outside of the train, cryptographic key and preferential price";

(12) The "Multistep train getting-off method" (also called as differential section train getting-off method) of the track train is invented on the basis of "Riding on the basis of length of journey" method: half of the trainset cars are waiting cars, while another half of the trainset cars are former waiting cars, which allows passengers to get on/off the train; when there is only one stop left to the terminal station, the passengers of the side-door cars (away from riding section) can go into the waiting car one stop in advance or go into short riding section and short riding section car and get off the train until the train gets to the terminal station, because both short riding section and medium riding section will be parked within the platform (are basically empty), this method is called as "multistep train getting-off method"; the multistep train getting-off method is applicable to most of the non-stop trains, inter-city light rail trains, high speed trains and EMU trains which have more than half of their passengers intend to get on and off the train respectively from the starting station and the terminal station.

(13) In this invention, the station ticketing system sells the section ticket that has its color correspond to riding section color one by one; the passenger gets on the car with same color as its ticket; the color corresponding to the riding section sign (symbol or color), ticket color, train interior and exterior colors is printed on the ticket; the former ticket with white background color is changed; only one rectangle white box is present in the middle of the ticket where the station name is printed; the cars are classified into short-journey car (blue ticket), relatively short-journey car (cyan ticket), medium-journey car (green ticket), relatively-medium car (yellow ticket), long-journey car (orange ticket) and longest-journey car (red ticket); these color are painted inside and outside of the cars in order; the passengers gets on the cars with the color corresponding to the ticket color.

Preferably, the "ticket checking program for respective riding" is introduced into the IC card ticket automatic ticket checking system of track train to implement the "Riding on the basis of length of journey" method; that is to say that the station ticketing system sells the "section ticket" in accordance with "section ticket selling procedure"; the "ticket checking program for respective riding" is followed in accordance with Preferential Price Parameter Table and Riding Section Distribution Structure to for the ticket checking system to check the passenger inbound station and outbound station and to check the section ticket;

"Section ticket selling procedure": the procedure is divided into two parts: ticketing system and section ticket;

(1) The station ticketing system sells the section ticket printed with "riding section" signs or the section ticket capable of recording "riding section" signs in accordance with passenger inbound station and destination station as well as Preferential Price Parameter Table and Riding Section Distribution Structure; the section ticket consists of journey ticket price and passenger section signs; the non-contact "city one-ticket-for-all" IC car for repeated usage are not included;

(2) Section tickets are classified into:

(1) The station ticketing system sells the section ticket printed with "riding section" signs in accordance with passenger inbound station and destination station as well as Preferential Price Parameter Table and Riding Section Distribution Structure; "section ticket" is the ticket that is printed with "riding section", it includes: high-speed train ticket, EMU train ticket, coach train ticket, intercity light rail train ticket, maglev train ticket, metro ticket, light rail train ticket, metro train single-ride ticket/card and light rail train single-ride ticket/card;

(2) The section ticket that is sold from the station ticketing system and is capable of recording "riding section" signs; it is used in the track train fare collection system applicable to IC card/ticket; it is featured by: comparing with existing IC card ticket, it is capable of recording "riding section" signs (symbol, word, number and cryptographic key, etc.); IC card ticket is classified into section ticket, PASMO, single-ride IC card section ticket;

IC card section ticket: for the track train fare collecting system applicable to the IC card ticket, the "section ticket" described in this invention includes non-contact IC card (also named as "non-contact IC card section ticket") which includes the non-contact city "one-card-for-all" IC card, CPU card, M1 card, magnetic card, PASMO card and other cards of the maglev train (part), intercity light rail train (part), metro train and light rail train;

Single ride IC card section ticket: for the track train fare collecting system applicable to the IC card ticket, it refers to the "single ride non-contact IC card section ticket" and magnetic card, etc.;

Preferably, in the field of measure and procedure: the "riding by differentiating railroad sections" method for the track train automatic ticket checking system (hereinafter referred to as automatic fare collection system, including automatic fare collection AFC system) is developed and invented for the implementation of "riding by differentiating railroad sections" method for train with length more than platform; AFC system database records the card swiping information of the passenger IC card, including inbound line number, inbound station code, inbound time, outbound line number, outbound station code, transaction time and the door-free car sign code.

The implementation of "ticket checking program for respective riding" method means to install the reader (the reader referred below includes radio frequency reader, magnetic card reader, IC card reader such as onboard ticket checking machine, POS machine, public transportation vehicle reader, etc.) on the automatic fare collection system (the automatic fare collection system described below includes the automatic fare collection AFC system; consisting of whole network AFC system clearing system, line central computer system, station computer system, station line equipment and ticket) applicable to train with length more than platform; the reader is connected to the automatic ticket checking system;

The whole network AFC system clearing system can be called as ticket clearing and distributing central computer system; the station line equipment can be called as station terminal equipment.

The reader (including POS machine) is used as the data information processing equipment for passenger train orientation; the IC card ticket that works with reading records of the station inlet and outlet ticket checking gates and establishes "reader-non-contact IC card" mode follows the management system of "riding by differentiating railroad sections" method.

The clearing system of the whole network AFC system enables the passenger to get on the train from any station listed on the "ticket checking program for respective riding" and to get the preferential treatment.

The connection types between the reader and the automatic fare collection system and central computer system include off-line, wireless and wired networking;

The reader is installed in the car or platform;

The reader cannot offer the locating or transmitting function independently, that is to say the section ticket that contains the non-contact IC card exchanges information with the reader, jointly composing the software mode of the "ticket checking program for respective riding" with the reader; The information exchange between the section ticket that contains the non-contact IC card and the reader is a hand-shaking process which requires actions of both sides and makes it impossible for one side to independently complete the "ticket checking program for respective riding" method; the application of the non-contact IC card borrows things from other inventions, that is to say the fee-recording technology of the existing non-contact IC card is applied to the invention of ticket checking program for respective riding;

The reader cannot offer the locating or transmitting function independently, that is to say the section ticket that contains the non-contact IC card exchanges information with the reader, jointly composing the software connecting mode of the "ticket checking program for respective riding" with the reader; that is to say the section ticket that contains the non-contact IC card serves to offer the locating or transmitting function in the ticket checking program for respective riding;

The connection types between the reader and the automatic fare collection system and central computer system include off-line, wireless communication networking and wired networking;

Preferably, software procedure: the automatic fare collection system, central computer system of the train with length more than platform is set with "ticket checking program for respective riding"; the procedure's technical features: among the procedures for automatic fare collection system and central computer software system, the reader (including wire frequency reader; including the radio frequency reader that is set in the car or station) is set for the program between the inbound ticket checking machine and outbound ticket checking machine; the reader and ticket (section ticket) exchanges information (including the location of the passenger in the car or platform); the section ticket includes non-contact IC card, "one-card-for-all" city card, section ticket (if the non-contact IC card is included, it can be called as "non-contact IC card section ticket") that is sold from the station ticketing system and capable of recording "riding section" signs; the information is compared with the pre-defined related regulations (including preferential ticket price regulation) to determine the passenger's ticket price; this serves for passenger to get in the proper car in accordance with riding section;

Preferably, the automatic fare collection system and central computer system of the train with length more than platform include the radio frequency reader (including ticket checking machine, POS machine, public transportation vehicle onboard reader, etc.) installed in the car or platform; that is to say the reader marked with passenger section sign and cryptographic key of appointed cars is installed in the car of the platform accommodating the waiting car; (or install the reader that is marked with appointed riding section sign or placed in the platform that accommodates the waiting car).

Preferably, the appointed "riding section sign" of central computer system and the "riding section sign" of central computer system: the reader installed in the outbound ticket checking machine, station ticket checking system AFC equipment, each car or the platform accommodating the waiting car;

Preferably, the reader referred in this invention includes the intelligent card reader that introduces the radio frequency identification technology (or called as IC card reader, that is to say the CPU card reader and M1 card reader) and magnetic card reader (such as public transportation vehicle reader), etc.; change the fee-recording function of the reader to the locating function.

Preferably, the non-contact IC card that can record "riding section" sign can also be called as "non-contact IC card section ticket";

Preferably, the technical features of program of automatic fare collection AFC system and central computer software system of the invention is to set the radio frequency reader program between the inbound ticket checking machine and outbound ticket checking machine;

Technical feature of program of the invention: among the programs for automatic fare collecting AFC system, central computer software system: set the radio frequency reader (or serves to check the ticket) program between the inbound ticket checking machine and the outbound ticket checking machine; set the program for radio frequency reader (including ticket checking machine, POS machine, public transportation vehicle reader, etc.) in the car or platform to ensure the riding in accordance with riding section.

Preferably, the radio frequency reader (including ticket checking machine, POS machine, public transportation vehicle reader, etc.) is set in the car or platform; the data and information transmission types for the reader with automatic fare collecting AFC system and central computer system include off-line system-wireless communication system and wired network system.

Preferably, in the field of equipment: for the transmission type of wireless communication system, the passenger information system (PIS) or \3G\4G\WIFI transmission types are used as the wireless transmission types; the wireless transmission type shall not affect ATC system and ensure the connection and wireless transmission between the onboard ticket checking machine (or POS machine, etc.) subsystem of radio frequency reader and automatic fare collection system;

Software program: in the field of transmission type of off-line system, the software program uses the numeral sum (the invention temporarily uses the numeral sum) as the cryptographic key of the radio frequency reader (public transportation vehicle reader) and as the sign to be marked on the section ticket as the riding section sign; the numeral sum does not function as the money, it functions as the cryptographic key of sign (the cryptographic key can also be any numeral value); the numeral sum value is deducted when calculating at the outbound ticket checking machine; the numeral sum is used as the cryptographic key, that is why the radio frequency reader (such as public transportation vehicle reader) is used; the central computer sets any password; at the outbound ticket checking machine, the sum of the cryptographic key is compensated by the same amount;

"System riding section sign" of central computer="inbound station number" recorded by the inbound ticket checking machine on the ticket+riding section sign of the passenger's car recorded by the reader on the section ticket (such as cryptographic key);

Central computer software system and the agreed "system riding section signs" are set at the outbound ticket checking machine, station ticket checking system AFC equipment, station computer system and central computer software system;

"System car riding section cryptographic key" of central computer system=(including symbol, number, word and sum, etc.); "System car riding section cryptographic key" is set in each car reader;

Preferably, software program: the radio frequency radio is set to transmit the recorded riding section sign and the unique card number of the section ticket to the program of automatic fare collecting AFC system and central computer software system, and the unique card number of the section ticket that is capable of recording riding section sign and sold from the station ticketing system is included (including non-contact IC card which can also be called as "non-contact IC card section ticket"); when the calculation is conducted at the outbound ticket checking machine through the program of the automatic fare collecting system and central computer software system, the passenger's outbound ticket price is obtained from the "inbound station number" recorded on the section ticket by the inbound ticket checking machine+the riding section sign and the number of stations covered by the passenger journey and preferential regulations and other related regulations; for the long-journey passenger failing to swipe the card ticket, the fare will be determined in accordance with actual ticket price; to prevent the short-journey passenger from getting into side-door car and causing congestion, when short-journey passenger swipes card ticket, a certain sum will be fined as additional ticket price;

Preferably, software program: in the field of wired communication system transmission types, the radio frequency reader is set in the platform which wired connects with automatic fare collection system; the software program is set for the radio frequency reader (including ticket checking machine and public transportation vehicle reader, etc.) to record the unique card number of riding section ticket and section ticket onto the section ticket, transmit it to automatic fare collecting system and central computer software system programs; the unique card number of section ticket that is sold from the station ticketing system and capable of recording riding section signs is included (included non-contact IC card can also be called as "non-contact IC card section ticket"); when calculating at the outbound ticket checking machine through automatic fare collecting system and central computer software system programs, the passenger's outbound ticket price is obtained from the "inbound station number" recorded on the section ticket by the inbound ticket checking machine+the number of stations covered by the passenger journey and preferential regulations and other related regulations; for the long journey passenger failing to swipe the card ticket, the fare will be determined in accordance with actual ticket price; to prevent the short-journey passenger from getting into side-door car and causing congestion, when short-journey passenger swipes card ticket, certain amount of ticket price will be deducted;

Procedure for passenger to follow: first step, station ticketing system sells the section ticket (including non-contact IC card, also be called as "non-contact IC card section ticket") that is capable of recording riding section signs; second step, swipe section ticket on inbound ticket checking machine; third step, swipe section ticket on the door-free car ticket checking machine installed on the platform, and record the riding section signs (symbol or cryptographic key, etc.) of the passenger's car; fourth step, outbound ticket checking machine, automatic fare collecting system, central computer software system programs check the consistency of the data on section ticket; when the consistency is proved, the passenger is allowed to leave the station; when the inconsistency is proved, the passenger shall make a supplementary payment; based on the software program setting, the short-journey passenger will be fined RMB 2 if he swipe the card.

The comfort and passenger density can be used as one factor to attract the passengers; the passenger density of the door-free car can be adjusted below 1.5 persons/m2, and the passenger density of the car within platform area can be adjusted above 2.5 persons/m2; the method of short-journey is fined when getting into door-free car is used to replace the preferential regulations.

Preferably, the appointed "system riding section sign" of central computer system and the "system cab riding section cryptographic key" of central computer system: is set for outbound ticket checking machine, station ticket checking system AFC equipment and onboard reader of each car;

The preferential regulations and "ticket checking program for respective riding" software system are set for the outbound ticket checking machine software system, station ticket checking system equipment software system, central computer software system; therefore, both charging system by sub-line (such as Xi'an metro ticket checking system) and charging system by city overall line (such as Beijing metro ticket checking system) are feasible, which allow the full implementation of the preferential regulations.

For the equipment: simplify the program, divide the platform into car within platform area riding area and preferential area (riding area of car beyond platform area); the preferential area is the platform area that corresponds with waiting car parking location (that is to say the riding area for long journey passenger); the car within platform area car riding area is the platform area that corresponds with car within platform area car parking location (riding area for shortjourney passenger);

The preferential area door-free car (or called as preferential area)access ticket checking machine is set on the platform to locate; that is to say make the long-journey passenger to swipe the card when getting into preferential area at the preferential area of the platform; swipe the card on the outbound ticket checking machine when leaving the station; the software system of the ticket checking machine charges at the preferential price in accordance with pre-defined ticket price preferential regulations; to prevent the short-journey passenger from going to the preferential area ticket checking machine and causing congestion and trampling accident, the semi-enclosed preferential area and fully-enclosed preferential area are introduced: passenger only swipes card when going into preferential area, and there is no gate in preferential area, that is to say the preferential area that only has the preferential access ticket checking machine belongs to the semi-enclosed preferential area; passenger swipes the card when going in the preferential area, and it is impossible to swipe the card when the passenger is out of the preferential area; gate will open when it senses the passenger planning to leave, and the passenger planning to get in cannot get in; that is to say it is the bidirectional accessible gate; the preferential area access ticket checking machine and unidirectional accessible gate compose the fully-enclosed preferential area; the semi-enclosed preferential area requires fewer space and allow convenient access; the semi-enclosed preferential area can prevent the short-journey passenger from going into the preferential area without card swiping; these two types can be chosen in accordance with passenger load; in general, each platform shall be equipped with at least one door-free car access ticket checking machine.

There is only one walkway in the door-free car; therefore, the weakness of the door-free car is that it requires the control of passenger density (generally, no more than 1-1.5 persons/m2, if this limit is exceeded, it is impossible for the passenger to move); therefore, to ensure the passenger can get into door-free car from its own car and get into the waiting car from the door-free car in 1 minute for the fully-enclosed preferential area and semi-enclosed preferential area, the number of passenger getting into the waiting car must be controlled within a proper range, such as 80 persons; if there is more than 80 persons, the inlet gate of fully-enclosed preferential area will light the red indicator or sound the buzzer to indicate the overload and advise the passenger to go into subsequent train; the implementation method is to install the counter at the inlet gate which is set within the proper range and connected with detector (including infrared detector); when the detector senses the departure of the train, it will stop counting; when the train arrives, it will start a new cycle to count.

The practicability of the invention is shown in the following fields: 1) ensure that the passenger can go from the waiting car to the door-free car and going from the door-free car to the waiting car in 1 minute; 2) ensure that the passenger can get on/off the train in 1 minute which is the time control standard of the train with length more than platform; arrange the number of stations for the passengers in the car within the platform area (preferably 5-6 stations), i.e. the passenger density is based on the time control criteria.

The passenger cannot get into the waiting car without getting through platform ticket checking machine; the passenger cannot get in without getting through ticket checking machine; the preferential area and short-journey riding section is separated in the platform to allow the long-journey passenger to get on the train from preferential area (that is to say to get on the train from the platform area corresponding to the waiting car) and the short-journey passenger to get on the train from the short-journey riding section (that is to say get on the train from the car within platform area platform); personnel will monitor the card swiping process; software program is set to fine RMB 2 for the short-journey passenger that swipes the card.

The platform reader can also allow long-journey passenger and short-journey passenger to get on the train separately: the platform location corresponding to waiting car is set with special channel for long-journey passenger and long-journey passenger ticket checking machine to allow the long-journey passenger to get into the waiting car through special channel for long journey passenger; the long journey passenger ticket checking machine can be installed adjacent to the waiting car in the platform;

Preferably, the "ticket checking program for respective riding" is invented; the procedure includes the software part and hardware part; the detailed "ticket checking program for respective riding" flow is shown as below: One of the technical features of the "ticket checking program for respective riding" hardware is to install the reader in the car; the second technical features of the "ticket checking program for respective riding" hardware is the section ticket (including non-contact IC card, can also be called as "non-contact IC card section ticket") that can record the "riding section" signs; the procedure is: central computer system appointed "system riding section sign" and central computer system "system car riding section cryptographic key":

Central computer "system riding section sign"="inbound station number" recorded on the section ticket by inbound ticket checking machine+riding section sign (cryptographic key, etc.) of passenger's car recorded on the section ticket by recorder; the central computer system sets the appointed "system riding section sign" in the inbound ticket checking machine, station ticket checking system equipment, station computer system; central computer system "system car riding section cryptographic key"=(including symbol, number, word and sum, etc.): "system car riding section cryptographic key" is set in each car reader;

The procedure for the passenger to follow: first step, station ticketing system sells the section ticket (including non-contact IC card, also be called as "non-contact IC card section ticket") that is capable of recording riding section signs; second step, swipe section ticket on inbound ticket checking machine; third step, swipe section ticket on the door-free car reader and record on the section ticket the riding section signs (symbol or cryptographic key, etc.) of the passenger's car; fourth step, outbound ticket checking machine conducts the following activities in accordance with "system riding section sign" and central computer appointed passenger "riding section" sign: check the consistency of passenger outbound station number, inbound station number and the "riding section" signs (symbol or cryptographic key, etc.) recorded on the section ticket; when the consistency is proved, the ticket price will be calculated in accordance with the preferential price set by the central computer, and the passenger is allowed to get out; when the inconsistency is proved, the passenger will be charged in accordance with the actual ticket price for the outbound station; for the section ticket, a certain sum will be deducted in accordance with the actual ticket price for the outbound station; for the single-ride section ticket, the passenger cannot get out of the station until he makes a supplemental payment for the discount fee at the outbound service desk; it shows the following features:

In the "ticket checking program for respective riding" password system for the fare collecting system of the track train applicable to the IC card ticket; the cryptographic key is set in the central computer program and door-free car's reader: that is to say to use the symbol, word, number and color as the riding section (sign) cryptographic key, set the cryptographic key in the reader, outbound ticket checking machine, station ticket checking system AFC equipment, station computer system and central computer system, record it into section ticket; the reader uses the numeral sum (the invention temporarily uses the numeral sum) as the cryptographic key and as the sign to be marked on the section ticket as the riding section sign; the numeral sum does not function as the money, it only functions as the cryptographic key of sign (the cryptographic key can also be any numeral value (sign)); the numeral sum value is deducted when calculating at the outbound ticket checking machine; the numeral sum is used as the cryptographic key, that is why the reader is used as the public transportation vehicle; the central computer system sets any password; at the outbound ticket checking machine, the number of the cryptographic key is compensated.

Preferably, the hardware technical features of the invented "ticket checking program for respective riding" include:

(1) The "ticket checking program for respective riding" is invented for the ticket checking system of the track train applicable to IC card ticket and shows the following features: readers are installed in the cab in the agreed sequence; the reader described in the invention includes the intelligent card reader introducing radio frequency identification technology (or called as IC card reader), that is to say, includes CPU card reader, M1 card reader, magnetic card reader (such as public transportation vehicle onboard reader), etc.; change the reader's fee recording function to locating function.

(2) For the ticket checking system of the track train applicable to IC card ticket, the new technology plan is prepared to record riding section sign (symbol, number, word, sign, color or cryptographic key) in the recording area of storing area of "section ticket" (including non-contact IC card, also be called as "non-contact IC card section ticket"); that is to say, add the function of recording "riding section" sign (symbol, number, word, sign, color or cryptographic key) from existing IC card ticket, extend the function of the IC card ticket during the track train ticket checking program from the payment to both locating and payment.

(3) For the ticket checking system of the track train applicable to IC card ticket, the readers in the invention are installed in the train with length more than platform in the agreed sequence; the reader can record the passenger riding section signs (symbol, number, word, sign, color or cryptographic key) in the "non-contact IC card section ticket" (recording area of the storing area); the onboard reader in the invention includes the intelligent card reader that introduces radio frequency identification technology (or called as IC card reader), that is to say the CPU card reader, M1 card reader, magnetic card reader (such as public transportation vehicle onboard reader), etc.; change the reader's fee recording function to locating function.

(4) For the ticket checking system of the track train applicable to IC card ticket, the hardware (auxiliary hardware) that follows the "ticket checking program for respective riding" includes:

(5) (auxiliary hardware) The outbound ticket checking machine installed with "ticket checking program for respective riding";

(6) The station ticket checking system AFC equipment, station computer system, central computer system that is installed with "ticket checking program for respective riding"; the fare collecting system of the station that introduces "riding by differentiating railroad sections" method;

Preferably, the waiting car and side-door-free cab are set with real-time rolling Inbound Station Number—Inbound Station Number—Riding Section Guidance Chart Electronic Display which displays in accordance with Preferential Price Parameter Table and Riding Section Distribution Structure; when the passenger newly gets on the train, the display will show the "real-time riding section sign color guidance" and take the inbound station as the original point for the passenger to view at any time the sign color of the riding section that he/she shall go to; The passenger newly getting into the car first confirms the sign color of the railroad section that he/she shall go to, goes into the riding section corresponding to its railroad section sign color, mark the riding section sign color with the reader; the passenger goes into the section where the riding section sign is marked in accordance with the electronic display in the station platform, ticket office and waiting car; the Inbound Station Number—Inbound Station Number—Riding Section Guiding Chart is pasted in each platform and car; see Price Parameter Table and Riding Section Distribution Structure as shown in FIG. 4; the passenger can view at any time the sign color of the riding section that he/she shall go to.

Preferably, password system of "section ticket checking program for respective riding": (Note: the working mode adopted by the enciphering and deciphering system is called as password system (that is to say the password encoding). The password system consists of two parts: cryptographic algorithm and cryptographic key. The former is the equation, rule or program which is open to the public; the latter is the parameter used in the calculation during enciphering and deciphering process; the change of cryptographic key means the change of relation between cleartext and ciphertext; the confidentiality of the information shall be ensured to prevent the leakage of cryptographic key.)

(1) The cryptographic key is set in the central computer program and reader; based on the short-railroad section, medium-railroad section and long-railroad section, the reader marks the riding section sign on the ticket with the cryptographic key RMB 0.01, 0.02, 0.03, 0.09 (to replace the sign; station confidentiality, self-set and temporally set); the cryptographic key of riding section sign of blue reader is RMB 0.01; the cryptographic key of riding section sign of yellow reader is RMB 0.02; the cryptographic key of riding section sign of red reader is RMB 0.03; the card with cryptographic key of RMB 0.09 for riding section sign from panchromatic reader can replace the card with other color riding section sign to get related discount; outbound ticket checking machine determines the passenger "riding section sign color" in the following procedure: blue passenger riding section sign color="inbound station number" recorded by the inbound ticket checking machine+RMB 0.01; yellow passenger riding section sign color="inbound station number" recorded by the inbound ticket checking machine+RMB 0.02; red passenger riding section sign color="inbound station number" recorded by the inbound ticket checking machine+RMB 0.03; panchromatic passenger riding section sign color="inbound station number" recorded by the inbound ticket checking machine+RMB 0.09;

(2) RMB 0.01-0.09 does not function as the money, it only functions as the cryptographic key of sign (the cryptographic key can also be any numeral value); the numeral sum value is deducted when calculating at the outbound ticket checking machine; the numeral sum is used as the cryptographic key, that is why the reader is used as the public transportation vehicle; the central computer system sets any password; at the outbound ticket checking machine, the sum of the cryptographic key is compensated to the same amount;

(3) The outbound ticket checking machine checks the riding section sign of the ticket/card in accordance with actual outbound station; verify the consistency of the outbound station and the inbound station number and the riding section sign recorded in the ticket/card; when the consistency is proved, the ticket price is determined in accordance with the preferential price set by the central computer, and the cryptographic key sum is compensated to the same amount at the outbound ticket checking machine.

Preferably, take FIG. 1-4 as the example: take the station number of 26 as the reference; for the line with a few passengers and door-free car, the 3×2=6 cars are added at the front and rear ends (12 cars in total); the riding section sign color, ticket color, car color, reader color and preferential sum are temporally set as below: 2-11 station is set with white ticket and white car; 12-16 station is set with riding section sign color of blue , blue ticket, blue car, blue reader and preferential sum of RMB 0.50; 17-21 station is set with yellow riding section sign color, yellow ticket, yellow car, yellow reader and preferential sum of RMB 1.00; 22-26 station is set with red riding section sign color, red ticket, red car, red reader and preferential sum of RMB 1.50; the ticket price is calculated in accordance with the colors of red, yellow blue and full color recorded by the reader; railroad section sign color (attributing to passenger) is a variable concept, while riding section sign color (attributing to car) is a fixed concept.

Take FIG. 1-4 as the example: when there are 26 stations altogether on the standard line: 12 cars;

When there are 26 stations altogether on the standard line: stations 1, 2, 3, 4, 5, 6, 7, 8, 9, 10, 11, 12, 13, 14, 15, 16, 17, 18, 19, 20, 21, 22, 23, 24, 25, 26; the railroad section corresponds with riding section one by one;

(1) The railroad sections are divided as follows: stations 2, 3, 4, 5, 6, 7, 8, 9, 10, 11 are the nearest railroad section with white road section sign; stations 12, 13, 14, 15, 16 are the short-railroad section with blue road section sign; stations 17, 18, 19, 20, 21 are the medium-railroad section with yellow road section sign; stations 22, 23, 24, 25, 26 are the long-railroad section with red road section sign;

(2) The riding sections are divided as follows: 1, 2, 3, 4, 5, 6 are the existing cars in the platform; stations 1 and 6 will be changed to the waiting cars in the invention; cars 7, 8, 9, 10, 11, 12 are the door-free cars which are out of the platform; cars 2, 3, 4, 5 are the nearest riding section with white riding section sign and white car; cars 7 and 10 are short-distance riding section with blue riding section sign and blue car color; cars 8 and 11 are the long-distance riding section with yellow riding section sign and yellow car color; cars 9 and 12 are the longer-distance riding section with red riding section sign and red car color; 13 represents the platform length.

Railroad section corresponds with riding section one by one: stations 2, 3, 4, 5, 6, 7, 8, 9, 10, 11 are the nearest railroad section which corresponds to the nearest riding section (white cars); stations 12, 13, 14, 15, 16 are the short railroad section which corresponds to the short riding section (blue cars); stations 17, 18, 19, 20, 21 are the medium railroad section which corresponds to the medium riding section (yellow cars); stations 22, 23, 24, 25, 26 are the long railroad section which corresponds to the long riding section (red cars);

The Car Section Distribution Structure Diagram of this line is as below: "riding section distribution structure"; 4 standard sections: stations (2-11), white—stations (12-16), blue—stations (17-21), yellow—stations (22-26), red; this can be simplified as 10 white—5-5-5 structure;

Preferably, take Beijing Metro Line 1 as an example which has 31 stations; except the nearest section, it is divided into short section, medium section and long section on the basis of railroad section;

station numbers 2, 3, 4, 5, 6, 7, 8, 9, 10, 11, 12 belong to the nearest section, and their corresponding riding section is the nearest riding section—white car; corresponding riding section of station numbers 13, 14, 15, 16, 17 is short-railroad section—blue car; corresponding riding section of station numbers 18, 19, 20, 21, 22 is medium-railroad section—yellow car; corresponding riding section of station numbers 23, 24, 25, 26, 27, 28, 29, 30, 31 is longest-railroad section—red car;

"Riding section distribution structure": four sections: 2-12 white; 13-17 blue (cryptographic key: 0, 01); 18-22 yellow (cryptographic key: 0, 02); 23-31 red (cryptographic key: 0, 03); Beijing Metro Line lextents from Pingguoyuan to Tupo; at the starting station of Pingguoyuan along the direction from Pingguyuan to Tuqiao, the real-time electronic guidance chart information on the Inbound Station—Outbound Station—Riding Section Guiding Chart Electronic Display is shown as below:

$1^{st}$ station—Pingguoyuan; $2^{nd}$ station—Gucheng; $3^{rd}$ station—Bajiao Amusement Park; $4^{th}$ station—Babaoshan; $5^{th}$ station: Yuquan Road; $6^{th}$ station—Wukesong; $7^{th}$ station—Wanshou Road; $8^{th}$ station, $9^{th}$ station—Military Museum; $10^{th}$ station—Muxidi; $11^{th}$ Fuxingmen; $12^{th}$ station—Xidan (stations 2-12 belong to nearest riding section—white cars); $13^{th}$ station—West Tiananmen; $14^{th}$ station—East Tiananmen; $15^{th}$ station—Wangfujing; $16^{th}$ station—Dongdan; $17^{th}$ station—Jianguomen (stations 13-17 belong to short—journey riding section-blue cars); $18^{th}$ station—Yonganli; $19^{th}$ station—Guomao; $20^{th}$ station—Sihui; $21^{st}$ station—East Sihui; $22^{nd}$ station—Gaobeidian (stations 18-22 belong to medium riding section-yellow cars); 23th station—Communication University of China; $24^{th}$ station—Shuangqiao (long riding section); $25^{th}$ station—Guanzhuang; $26^{th}$ station—Baliqiao; $27^{th}$ station—Guoyuan; $28^{th}$ station—Jiukeshu; $29^{th}$ station—Liyuan; $30^{th}$ station—Linheli; $31^{st}$ station—Tuqiao (stations 23-31 belong to long-journey riding section-red cars);

Car Section Distribution Structure Diagram of this line: (2-12) white, (13-17) blue, (18-22) yellow, (23-31) red which is summarized as 11-5-5-8;

Passenger A gets on train from Station Wukesong for Communication University of China; station number of 23−station number of 5=station number of 18; station number of 18 corresponds to the medium riding section-yellow car; when he gets on the train, the real-time guiding electronic chart on the Inbound Station-Outbound Station-Riding Section Guiding Chart Electronic Display is shown:

$1^{st}$ station—Pingguoyuan; $2^{nd}$ station—Gucheng; $3^{rd}$ station—Bajiao Amusement Park; $4^{th}$ station—Babaoshan; $5^{th}$ station: Yuquan Road; $1^{st}$ station—Wukesong (Inbound station of Passenger A); $2^{nd}$ station—Wanshou Road; $3^{th}$ station—Gongzhufen, $4^{th}$ station—Military Museum; $5^{th}$ station—Muxidi; $6^{th}$ station—Fuxingmen; $7^{th}$ station—Xidan; $8^{th}$ station—West Tiananmen; $9^{th}$ station—East Tiananmen; $10^{th}$ station—Wangfujing; $11^{th}$ station—Xidan; $12^{th}$ station—Jianguomen (stations 2-12 belong to nearest riding section-white car); $13^{th}$ station—Yonganli; $14^{th}$ station—Guomao; $15^{th}$ station—Sihui; $16^{th}$ station—East Sihui; $17^{th}$ station—Gaobeidian (stations 13-17 belong to short riding section-blue cars); 18th station—Communication University of China (destination station of Passenger A); $19^{th}$ station—Shuangqiao; $20^{th}$ station—Guanzhuang; $21^{st}$ station—Baliqiao; $22^{nd}$ station—Guoyuan (stations 18-22 belong to medium riding section-yellow cars); $23^{rd}$ station—Jiukeshu; $24^{th}$ station—Liyuan; $25^{st}$ station—Linheli; $26^{th}$ station—Tuqiao; (stations 23-26 belong to longest riding section-red cars). Therefore, after seeing the guiding electronic display and waiting until all passengers in waiting car get off the train, Passenger A goes into the waiting car and finds that the station of Communication University of China corresponds to yellow car through the real-time guiding electronic chart shown on the Inbound Station—Outbound Station—Riding Section Guiding Chart Electronic Display: (because the trainset contains no transitional door-free car; if there is transitional door-free car, the unidirectional door of transitional door-free car opens and passenger goes into transitional door-free car; because the inlet passage of bidirectional walkway is not blocked, the passenger can quickly goes into door-free car; the unidirectional inlet passage of transitional door-free car closes, outlet passage door opens); Passenger A goes into blue car, then goes into yellow car and swipe the card on the reader with onboard LED yellow lamp for RMB 0.02 (means RMB 0.02 is paid); the train gets to Gaobeidian Station, the train broadcasting system sounds "Passengers for Communication University of China, please get off and go to the waiting cars to get ready for getting off"; (unidirectional outlet passage door of transitional door-free car opens, Passenger A passes through the transitional door-free car) and goes into waiting car; the whole train gets to Communication University of China, the Passenger A gets off the train and verifies his arrival at Wukesong Station via outbound ticket checking machine; for the journey fare to Communication University of China (in accordance with Preferential Price Parameter Table and Riding Section Distribution Structure), RMB 0.02 shall be swiped from the cryptographic key ticket card for the blue car; RMB 0.02 is swiped from Passenger A's ticket card; based on the preferential price of RMB 0.50+0.02 and the deducted RMB 0.02, the preferential ticket price of Passenger A is RMB 0.50; the reader, outbound ticket checking machine upload the transaction record of Passenger A to station ticket checking system AFC system, upload the transaction record of Passenger A to station computer system and upload the transaction record of Passenger A to central computer system, indicating the completion of the process.

The wireless transmission system of the reader for ticket checking procedure: there is interface between automatic ticket checking system AFC and door-free car; transmission type: wireless transmission, including passenger information system (PIS), 3G 4G, WIFI.

Wireless transmission type of readers of ticket checking procedure and door-free car: there is interface between automatic ticket checking system AFC and door-free car; transmission type: wireless transmission, including existing ATC system or CBTC system wireless transmission system; or combined application of existing ATC system or CBTC system wireless transmission system; including onboard controller, via data communication subsystem DCS and regional controller communication and automatic fare collection system ATC; NMS, WSP.

When the metro stops, to eliminate the sense of danger of passenger in the door-free car of train with length more than platform at the dark tunnel, the advertising lamp house is installed at the parking position of the door-free car in the metro tunnel for lighting; the advertising lamp house refers to the advertisement that serves to illuminate, including electronic advertisement whose content can be set or replaced without manual operation (the advertisement content can be set or replaced in the platform or central computer system control center); the advertisement can also be connected with existing metro station electronic advertisement media via internet.

The advertising lamp house is installed at the parking position of the door-free car (outside of car window) in the metro tunnel; the advertising lamp house refers to the advertisement that serves to illuminate, including electronic advertisement, computer network advertisement, electronic display advertisement, advertisement designed and printed via computer (or computer) directly printed, POP bills and posters, lamp house advertisement, wall advertisement, Focus Media advertisement, Target Media advertisement, electronic billboard advertisement, LED display, advertising machine, liquid crystal display, digital photo frame, etc.

To reduce the weight of the car, the carbon fiber is used as the material of surface layer and bottom layer of car skins of top module, side wall module, end wall module and door leaf of the track train, light rail train, double-decked light rail train.

Long railroad train shall be used at high peak time of passenger flow and existing railroad train shall be used at low-peak time of passenger flow to create dynamic formation and save energy.

The capacity or number of the traction substations of the track train, light rail train and double-decked train is larger or more than before.

The "overlapped translational automatic door for platform shield gate of long track train" is used in the invention; the platform shield gate is specially used for the passenger in the waiting car of the long track train to safely pass the platform shield gate; platform shield gates are located on the two ends of the platform (inside) and correspond to the inlet and outlet doors of the waiting car one by one, therefore, the passenger in the waiting car can safely get to the platform; it shows the features that the length of platform shield gate corresponds to the that of inlet and outlet doors of the waiting car;

Technical characteristics of the shield gate of train with length more than platform (in structure) are as follows:

The shield gate of train with length more than platform (in structure) shall conform to the principle of maximizing total gate net width; on the basis of soundness and safety of the whole car structure, the total platform shield door net width shall exceed the total net width of existing platform shield door; including: total platform shield door net width exceeds total existing side door (door on one side) net width (about 8 meters; total net width 1.4×5=7.5 meters); that is to say total door (door on one side) net width of metro and light rail train is over 8 meters;

In the invention, the overlapped translational automatic door of the platform shield gate is used:

The overlapped translational automatic door of the platform shield gate shows the following technical features: when nearby two side doors open, the nearby door leaves (front door leaf and rear leaf) overlap car side wall; overlapping types: selected overlapping of internal sliding plug door automatic door, external sliding plug door automatic door, embedded door, external swing door automatic door, external swing door automatic door, external sliding door automatic door;

Overlapping type: 1) Embedded and exposed overlapped translational automatic door with platform shield gate side wall as the center line; embedded door overlaps exposed sliding plug door; embedded door overlaps external sliding door; embedded door overlaps external sliding door; embedded sliding plug door overlaps exposed sliding plug door; embedded sliding plug door overlaps external sliding door; embedded sliding plug door overlaps external swing door;

2) Take the side door as the exposed and further exposed overlapped transitional automatic door in the most inside layer; exposed sliding plug door overlaps further exposed sliding plug door; external sliding plug door overlaps further exposed external sliding door; exposed external swing door overlaps further exposed external swing door; exposed sliding plug door overlaps further exposed external swing door; exposed external swing door overlaps further exposed external sliding door; exposed external sliding door overlaps further exposed external sliding door;

3) Take the platform shield gate side wall as the embedded, further embedded and overlapped transitional automatic door at the most outside layer; internal sliding plug door and internal sliding plug door overlapped automatic door; embedded door and embedded door overlapped automatic door; internal sliding plug door and embedded door overlapped automatic door;

Other types of platform shield gate:

4) Parallel post-type automatic door of platform shield gate is featured by the parallel post which is vertical to the car when the door leaf opens;

Parallel post-type vertical door—rotating shafts of two nearby side doors are placed vertically; parallel posts; total net width approaches the length of platform shield door side door to the greatest extent; when door leaf opens, it is vertical to the car; the external swing door opening type of existing metro (or bus) is used; the door opening angle can ensure that the door leaf is vertical to platform shield door side door when the door leaf is fully opened to attain the maximum door opening net width:

When the door leaf opens outward, use the external swing door of existing metro to adjust the length of upper and lower bending arms and location of rotating shaft and adjust the length of upper and lower hinges of door leaf; to ensure the matchup of length of upper and lower bending arm of door leaf and rotating shaft position and length of upper and lower hinges of door leaf and rotating shaft position and door leaf edge to ensure that the door leaf is vertical to the car when the door leaf is fully opened;

Parallel post-type automatic door of platform shield gate includes the external swing door with door leaf opened outward; parallel post-type automatic door of platform shield gate includes the internal swing door with door leaf opened inward 5) When different types of door overlapped doors are used in the same trainset, the same electric control controlling system, that is to say, use the same electric control electric door controlling system; or when the same electric control pneumatic door controlling system, it shall match with the in-platform car electric controlling system and connect with train automatic control ATC/ATC unit; it is controlled by ATO system; It has connection interface with train automatic control ATO system and is controlled by train automatic control ATO system;

In the invention, the overlapped transitional automatic door of platform shield door is used: overlapped door with more than two layers, including three-layer overlapped door, four-layer overlapped door; see information on two-layer overlapped door for composition of three-layer overlapped door and four-layer overlapped door of shield gate;

Overlapping types of front and rear doors of overlapped transitional automatic door: composition of embedded door, external sliding plug door overlapped automatic door, external swing overlapped automatic door, sliding door overlapped automatic door, internal sliding plug door overlapped automatic door at different positions of side wall:

(1) Embedded and exposed overlapped transitional automatic door and further external overlapped transitional automatic door with the shield gate side wall as the center line include:

Embedded door and external sliding plug door overlapped automatic door and further external sliding plug door overlapped automatic door;

Embedded door and external sliding door overlapped automatic door and further external sliding door overlapped automatic door;

Embedded door and external swing door overlapped automatic door and further external swing door overlapped automatic door;

Internal sliding plug door and internal sliding plug door overlapped automatic door and further internal sliding plug door overlapped automatic door;

Internal sliding plug door and external sliding door overlapped automatic door and further external sliding door overlapped automatic door;

Internal sliding plug door and external swing door overlapped automatic door and further external swing door overlapped automatic door.

(2) Exposed and further exposed overlapped transitional automatic door and further exposed overlapped transitional automatic door with the shield gate side wall as the most inside layer include:

External sliding plug door and further external sliding plug door overlapped automatic door and further external sliding plug door overlapped automatic door External sliding plug door and further exposed external swing door overlapped automatic door and further exposed external swing door overlapped automatic door;

External sliding plug door and further exposed external sliding door overlapped automatic door and further exposed external sliding door overlapped automatic door;

External swing door and further exposed external swing door overlapped automatic door and further exposed external swing door overlapped automatic door;

External swing door and further exposed external sliding door overlapped automatic door and further exposed external sliding door overlapped automatic door;

External sliding door and further exposed external sliding door overlapped automatic door and further exposed external sliding door overlapped automatic door.

(3) Embedded and further embedded overlapped transitional automatic door and further exposed overlapped transitional automatic door with the shield gate side wall as the most outside layer include:

Internal sliding plug door and internal sliding plug door overlapped automatic door and further internal sliding plug door overlapped automatic door;

Embedded door and embedded door overlapped automatic door and further internal sliding door overlapped automatic door;

Internal sliding plug door and embedded door overlapped automatic door and further embedded door overlapped automatic door;

Preferably, in the invention, the overlapped transitional automatic door of platform shield door is used: overlapped transitional automatic door of platform shield door shows the following technical features: when two nearby car side doors open, the front leaf and rear door leaf (nearby door leaves) and side wall overlap:

The two-layer overlapped transitional automatic door of platform shield door is used: overlapped transitional automatic door of platform shield door shows the following technical features:

When two nearby car side doors open, the front leaf and rear door leaf (nearby door leaves) and side wall overlap in the following ways:

The multi-layer overlapped transitional automatic door of platform shield door is used: overlapped transitional automatic door of platform shield door shows the following technical features:

When two nearby car side doors open, the front leaf and rear door leaf (nearby door leaves) and side wall overlap:

The overlapped transitional automatic door of the platform shield gate are connected to and controlled by ATC system.

Overlapping types of front and rear doors of two(or more)-layer overlapped transitional automatic door: composition of embedded door, external sliding plug door overlapped automatic door, external swing door overlapped automatic door, sliding door overlapped automatic door, internal sliding plug door overlapped automatic door at different positions of side wall.

Implementations

Railroad train takes Metro train composition as example:

As shown in FIG. 1-1, there are totally 26 stations along the line: 1, 2, 3, 4, 5, 6, 7, 8, 9, 10, 11, 12, 13, 14, 15, 16, 17,18, 19, 20, 21, 22, 23, 24, 25, 26 stops, and the whole line is divided into 7 sections; 18 cars Preferential Price Parameter Table and Riding Section Distribution Structure Equation "Riding Section Distribution Structure Equation"; for short; 6 sections: the structure is 2-8 white; —9-11 blue; —12-14 cyan; —15-17 green; —18-20 yellow; —21-23 orange; 24-26 red, and it is abbreviated to 8 white-3 blue (secret key 0, 01) —3 cyan (secret key 0, 02) —3 green (secret key 0, 03) —3 (secret key 0,05) —3 orange (secret key 0, 06) —24-26 red (secret key 0, 06);

(1) the process of riding Metro train composition: Railroad train takes Metro train composition as example, the door-free car of longer-than-platform track train at the dark tunnel is too dark and can cause the passengers feel unsafe, so setting up Ad light boxes on both sides of the tunnel wall will kill two birds with one stone; The upside "Y" turnout lead rail end of subway terminal and the upside "Y" turnout lead rail before the platform shall be increased to be equal to the length of the total length of whole car, and it is the rail length of track switch that the new 12 cars without side doors need, arrange the originally composed 1.6 car with driver at the first two cars of the new composition, and it remains as the end car and head car of the train. 1 car and 6 car are at both ends of the platform and they are replaced with the 1 and 6 waiting cars, when this train composition stopped at the platform, 1-6 cars are still at both ends of the station. When at the first station, passengers get on the train into cars without side door via 1.6 waiting car, while car 2, 3, 4, 5 are for special passengers include the disabled, the old, patients and pregnant woman; passengers on the short distance, sub-short distance, medium distance, sub-medium distance, long distance or the farthest journal shall get into train car without side doors 7.8.9.10.11.12.13.14.15.16.17.18 before or after the platform; after the appliance crew supervise that all the passengers get on the train, he will check on the monitor display, if there are no one in front of the train door, turn off the switch of the total door, or turn off the switches of single doors separately, and then the train starts running, let the passengers who will get off the train in the next station gather in the waiting car together, when the train arrived at station, they will get off together. The electrical station reporting display board and broadcast make the passengers gather in the waiting car in time, and let the passengers in the no-side door car outside of platform get into the centralized waiting car through gangway one station ahead, and to wait for getting off the train when it arrived at station. The train waiting car stopped at the standard lie within two ends of the platform, since passengers gather in the waiting car one station ahead, therefore, when the train arrived, all gathered passengers can get off the train quickly without obstruction, and there are also trainman in the car specialized in monitoring whether passengers in waiting car all get off the train. When the waiting car is empty, passengers on the platform can get on the train quickly without obstruction, and passengers who will get off the train in 2 station start to wait in 1.6 waiting car; when the train arrived at the second station, the waiting car stopped at the standard line within both ends of the platform, and passengers in 1 and 6 waiting cars get off at first, after all the passengers in waiting car get off and the completion of the inspection of appliance crew, the passengers on the platform get on the train again and get into the car without side doors, then, the appliance crew recheck the monitor display, if there are no passengers in front of the door, turn off the switch of total doors, or turn off the switch of single doors separately. The passengers who will get off in the 4 station start to come to waiting car to gather together, when the train arrived at the 4 station, the train waiting car stopped at the standard line within both ends of platform, and passengers in 1.6 waiting cars get off firstly, after all the passengers in the waiting car get off completely and the completion of inspection by the appliance crew, passengers on the platform get on the train and get into the car without side doors, then the appliance crew inspect that whether all the passengers get on the train safely . . . and that circle repeats. When the train arrived at the terminal, it then enter the upside "Y"-shape lead rail which was increased to be equal to the length of the new car length. The train driver turn around and then start the new round trip; on the lines on which the passengers are too many, it is permissible to add the waiting car beyond platform between waiting car and door-free cars, passengers first come to the waiting car beyond platform, then come to the waiting car or door-free car, and there are no seats in both of waiting car and waiting car beyond platform; on the lines on which the passengers are too many, it is permissible to add transitional door-free waiting car between waiting car and door-free car, passengers first come to the transitional door-free car, then transition to waiting car or door-free car, and there are no seats in the waiting car and transitional door-free car. After the passenger peak, rail train can remove a portion of door-free car during 13.00-17.00 and 21.00-24.00, so as to decrease empty load and perform dynamic composition.

(2) the ticket checking process of "ticket checking program for respective riding on section ticket":

if there are totally 26 stations along the line: 1, 2, 3, 4, 5, 6, 7, 8, 9, 10, 11, 12, 13, 14, 15, 16, 17,18, 19, 20, 21, 22, 23, 24, 25, 26 stops, and the whole line is divided into 7 sections; 18 cars Preferential Price Parameter Table and Riding Section Distribution Structure Equation (omit) "Riding Section Distribution Structure Equation"; 6 sections: the structure is 2-8 white; —9-11 blue; —12-14 cyan; —15-17 green; —18-20 yellow; —21-23 orange; 24-26 red, and it is abbreviated to 8 white-3 blue (secret key 0, 01) —3 cyan (secret key 0, 02) —3 green (secret key 0, 03) —3 (secret key 0,05) —3 orange (secret key 0, 06) —24-26 red (secret key 0, 06);

one passenger get on the train in 6 station and get off the train in 16 station; in the 16−6=10, 9-10 stations, the railroad section signing color are blue. Therefore, passengers shall get into the car with blue singing color, passenger with single-ride ticket shall buy blue ticket, and check the Inbound Station—Outbound Station—Car Section Guiding Chart Electronic Display or Inbound Station—Outbound Station—Car Section Guiding Table, and it show that 16 station is now shown in blue;

LED blue reader inputs 0.02 yuan, that means 0.02 yuan is deducted from the ticket card (because the memory area of IC card has recording area, and in the recording area, there are details of every transactions called "log" for enquiries.) Outbound ticket checking machine check the marks of car section of the ticket card in accordance of the fact that the actual outbound time is 16. As per the Price Parameter Table and Riding Section Distribution Structure Equation set by central computer, confirm that whether the outbound place is in conformity with 6 inbound and 0.02 yuan, if they are in conformity, then the ticket price can be obtained by the preferential price set by central computer; if IC card memory area has a record of 0.2 yuan, and the IC card inbound for 6 times, then the preferential price parameter is 3−0.5+0.02−0.02=2.5 yuan; if it is not in conformity with either one of the above mentioned records, the original price 3.00 yuan prevails, single trip ticket mode is the same as this;

one passenger get on the train in 7 station and get off the train in 22 station; in the 22−7=15, 15-17 stations, the railroad section signing color are green. Therefore, passengers shall get into the car with green singing color, passenger with single-ride ticket shall buy green ticket, and check the Inbound Station—Outbound Station—Car Section Guiding Chart Electronic Display or Inbound Station—Outbound Station—Car Section Guiding Table, and it show that 22 station is now shown in green;

LED green reader inputs 0.05 yuan, that means 0.05 yuan is deducted from the ticket card. Outbound ticket checking machine check the marks of car section of the ticket card in accordance of the fact that the actual outbound time is 22. As per the Price Parameter Table and Riding Section Distribution Structure Equation set by central computer, confirm that whether the outbound place is in conformity with 7 inbound and 0.05 yuan, if they are in conformity, then the ticket price can be obtained by the preferential price set by central computer; if IC card memory area has a record of 0.05 yuan, and the IC card inbound for 7 times, then the preferential price parameter is 4.00−1.00+0.05−0.05=3.00 yuan; if it is not in conformity with either one of the above mentioned records, the original price 4.00 yuan prevails, single trip ticket mode is the same as this;

Preferably, the upside "Y"-shape lead rail end of train coach terminal shall be increased to be equal to the length of the total car length of the newly added length, and it is the rail length of track switch that the new door-free car needs, the rail between the turnouts of both ends of the platform front and the rail at turning point shall correspond to the additional rail length, so as to make the new rail length slightly longer than the increased length of the new train composition; Put the originally composed 1.18 cars with drivers at the first two ends, and they remained as the end car and head car of the train, since the position of 1.18 cars are at both ends of the platform, replace the original car 1, 18 with waiting car 1, 18

The standard line, express car from Xi'an to Beijing, has totally 6 stations: 1.2.3.4.5.6 stops.

2 and 3 stations are the closest section, and their according riding section is the closest riding section—white car; 4-5 stations' according riding section is short-distance section—blue car; 6 station's according riding section is long-distance section—red car;

This line "Riding Section Distribution Structure Equation": 3 standard sections: (2-3) white-(4-5) blue-(6) red; and this structure is abbreviated as 2 white-2 blue-1 red;

FIG. 1-3 are the diagram of train coach composition, 1, 2, 3, 4, 5, 6, 7, 8, 9, 10, 11, 12, 13, 14, 15, 16, 17, 18 are the existing 18 cars in the platform, turn 1 and 18 cars into waiting cars, 19, 20, 21, 22, 23, 24, 25, 26, 27, 29, 30, 31, 32, 33, 34, 35, 36 into door-free cars which is in the outside of platform, 19, 20, 21, 28, 29, 30 cars are short-distance blue car, 22, 23, 24, 31, 32, 33 are medium-distance yellow car, 25, 26, 27, 34, 35, 36 are long-distance red cars; 19, 28 cars are transitional door-free cars; 37 are the platform length;

Xi'an, Weinan, Sanmenxia, Zhengzhou, Luoyang, Shijiazhuang, Beijing;

(1) railroad section can be divided into: (2-3) white riding area; (4-5) blue riding area; (6) red riding area;

(2) riding section can be divided into: 1, 2, 2, 3, 4, 5, 6, 7-car's closest riding section with white riding car section; 8, 9, 10, 11, 12, 13, 14, 15, 16, 17 cars are short-distance riding sections with blue riding rising section signing are blue cars; 19, 20, 21, 22, 23, 24, 25, 26, 27, 28, 29, 30, 31, 32, 33, 34, 35, 36-cars are long-distance riding section with red riding section signing; 1 and 18 cars are waiting car—half waiting car and half waiting car of the original car, that is because the number of passengers getting on the train in Xi'an and get off in Beijing accounts for two-thirds. Since white and blue riding sections are both within the platform, so passengers can get off right into the platform, after the train arrived at Shijiazhuang, passengers in the red riding section can go to waiting car or other cars from which they can get off right into the platform, therefore at this time, these cars are almost empty, waiting for the train arriving in Beijing, at that time, passengers on board will get off, and this can be called as "multistep train getting-off method".

Preferably, to prevent the tailgating of track coach train composition whose length is longer than the platform, in the track coach train composition system's signal system, all the train lengths are designed as the length of track train within platform area plus the length of train beyond platform area; the length of railroad train within platform area plus the length of railroad train beyond platform are is referred to as the length of train with length more than platform; signal system SIG consist of the automatic control system (ATC) system and the universal peripheral signal equipment, this design contains the automatic control (ATC) system;

This designed automatic control system (ATC) of train with length more than platform is abbreviated as "ATC system of train with length more than platform".

Unless otherwise stated, the track train in this invention refers to metro trains, light trains, maglev trains, high speed trains (or high-speed rail trains and EMU train), intercity light rail train, intercity light rail commuter train; and the high-speed railroad signal and control system adopted by high-speed rail trains and EMU train can also be applied into the track, this system with ATC system are generally known as Advanced Train Control Systems (ACTS), track train includes double-track trains), the track train with side door for passengers getting on/off the train are referred to as "track train within platform area", and the track train without side door is referred to as "track train beyond platform"; called as the ATC system of train with length more than platform and automatic train control system form as a whole; signal system SIG is composed of automatic train control system and the universal peripheral signal system, this invention mainly refers to automatic train control (ATC) system;

ATC system is composed of Automatic Train Supervision (ATS) system, Automatic protection (ATP) system, Automatic Train Operation (ATO) system and Computer Interlocking (CI) system;

Based on the length of train composition, the hardware upgrading and reforming or writing new program for software can be done for the existing track train ATC system. This system together with the train with length more than platform compose the type selection of Automatic Train (length more than platform) Control system; the type selection includes the following: Wabtec ATC, Siemens ATC, US £| S ATC, AISTOM ATC and domestic experimental movable closed ATC system, Siemens CBTC, Seltrac S40 CBTC, Seltrac CBTC, Alstom CBTC, USSI CBTC, LCF-300 CBTC, CITYFLO-650 CBTC, AISTOM CBTC, Alcatel CBTC, high speed CTCS-3 and CTCS-2 train control system, including high speed railroad signal and control system are all known as Advanced Train Control System (ACTS), such as ATCS (North America), ARES, ETCS (Europe), ASTREE (France) and CARAT (Japan). The control pattern of ATC system has different names in different lines in different cities, but its control methods are basically much the same; the hardware train track (the length of track train within platform area plus the length of train beyond platform area) and the ATC system compose as a whole; you can choose the matching ATC system or CBTC system and interface circuit based on different application conditions;

technical features: the existing track train's ATC system and the ATC system in the track trains whose length is the train length plus the length of train beyond platform area are composed as a whole;

Special attention shall be given to that in this invention, the length of train beyond platform area is a space concept with both ends of the platform as the limits, not simply for the quantity of cars and it refers in particular to the train length out of the two ends of the platform, i.e.: (at least) one or more cars without side doors out of the two ends of the platform;

In the ATC system, the length of track train has to be reset, which means to set the inherent data train length as the length of train with length more than platform; and the setting is as the following:

The hardware upgrading and reforming procedures include but not limited to the following: Security positioning, storage unit (database included), movement authority limit LMA, computing function and writing the new software program, and the inherent data train length is set as the length of train with length more than platform;

In EMU, all the security positioning, storage unit, storage unit (database unit included), car-carried ATP, ground control center TCC, interlocking IXL, LEU, ZFW2000 and Radio Block Centre, of which the inherent data train length are all set as the length of train with length more than platform;

(1) In the ATO subsystem, the train length are all set as the length of train with length more than platform; Control the speed curve and train position according to the train drive, brake device and thus control the train speed;

(2) In the ATS subsystem—supervisory control method system, the train length are all set as the length of train with length more than platform: and it can be divided as 3 types: centralized control type, centralized supervision and decentralized control type and autonomous decentralized type;

(3) In the positioning system, the inherent data train length are all set as the length of train with length more than platform; The long railroad train ATC system's train security positioning methods include but not limited to the following: railroad circuits positioning, axle counter positioning, induction loop wire positioning, wireless spread spectrum positioning and inertia positioning; in all the above positioning system, the train length are all set as the length of train with length more than platform;

In CBTC system, on-board equipment, speed sensor, radar and positioning transponder determine the train position together and report the position information to the ground ATP device, among these reported information, all the train length included are all set as the length of train with length more than platform; the ground ATP device will calculate LMA for the succeeding train according to the preceding train's position and the state information of line obstruction; and the inherent data train length are all set as the length of train with length more than platform;

length of train plus the length parameters recorded by all positioners of the long railroad train ATC. Including the transponder of the train's location beacon, axle counter (or ACE composed by microcomputer), track circuit for train positioning (station function for line supervision), trackside indication sign, ground annunciator and on-board signal, wherein the train length in these positioners shall be the length of train with length more than platform;

On-board equipment of high-speed train obtain the train's location information by the positioning transponder, and the train length transferred from these train locators are all set as the length of train with length more than platform; on-board equipment has the function of determine the location of the train, this function is achieved by the following method: on the basis of the information received from ground transponder and with the help of velocity measure instrument to measure the train's running distance, thus obtain the train position, of which the inherent data train length are all set as the length of train with length more than platform;

(4) The inherent data train length in the storage unit (database included) are all set as the length of train with length more than platform; i.e. the data train length stored in the database storage unit are all set as the length of train with length more than platform; the train length parameter stored in the long railroad train ATC system's database storage unit are all set as the length of train with length more than platform; data storage unit include the following: storage unit (central controller included), storage unit of central controller, storage unit of ATC area controller, onboard ATC storing unit, storage unit DSU database of CBTC system, embedded database, real-time database (such as RTDB); high-speed data input and storage—on-board device records the train parameters from the external, The longer-than-platform railroad train length is increased by data storage unit to the length that equals to the length of train within platform area plus train beyond platform area length, and the length is set to be stored in a read-only database; since it has great importance and in order to avoid loss or random change, the length of longer-than-platform railroad train shall be increased and included the length of train within platform area plus that of train beyond platform area and shall be only stored in a read-only database;

(5) In the ATP subsystem's train operation interval control method, the inherent data train length are all set as the length of train with length more than platform;

Target speed system: the wayside equipment of ATP subsystem transfers the speed instruction information of the block section to the train, and a block section shall be added to the system which adopts outlet speed control as protection section; the train length in the system are all set as the length of train with length more than platform;

Target distance system: the train speed control is a speed curve, the ground devices of ATP subsystem transfer the occupation information of preceding train and the according section's line data, or the permissible LMA, the on-board equipment of ATP subsystem will generate the operation speed curve of the train based on the target distance of train operation and the according line data, so as to ensure the train's safe running without exceeding the train's movement authorization (distance); the train length in the system are set as the length of train with length more than platform;

(6) In the block section system, the inherent data train length are all set as the length of train with length more than platform; For the block section system in ATC system of long railroad train, including fixed block system, quasi-moving block system, moving block system, virtual block system, the inherent data of train length shall be set as the length of train with length more than platform; the virtual block system is defined according to the data control of the regional controller instead of block section of physical sense;

In the movement authorization system which is established by the principle of block section, the inherent data train length are all set as the length of train with length more than platform; for the "target-distance" control system of the long railroad train ATC system, including movement authorization, movement authority limit LMA, and movement authority (MA) of high speed railroad train control system, the inherent data train length are all set as the length of train with length more than platform;

To calculate the algorithm of LMA, algorithm of MA of high-speed railroad train control system, generation method of MA of long railroad train CTCS-3 train control system and CTCS-2 train control system, the inherent data of train length shall be the length of train with length more than platform; The algorithm of LMA of different ATC system software varies; however, each algorithm shall include the length of the train, i.e.: the length of the train shall include the length of train within platform area plus the length of train beyond platform area;

During the design of the length of block section in fixed block for ATC system of train with length more than platform, the length of train with length more than platform is designed as the length of train within platform area plus the length of train beyond platform area , the most unfavorable braking ratio and other unfavorable conditions are used;

(7) The train operation route control technique (interlocking) set the ground signal at both sides of the turnout, so as to ensure the route safety of intermediate station with turnout and the re-entrant station; signal, turnout and route have a inter restrictive relation, this relation is called interlocking relation;

In the Computer Interlocking System, the inherent data train length are all set as the length of train with length more than platform; The concrete conditional train length is the length of train with length more than platform; interlocking function: respond to the command from ATS function, control the access, turnout and signal under the premise of safety, send the status data of access, track circuit, turnout and signal to ATSATC functions and the interlocking function is achieved by the trackside equipment;

Computer interlocking is a real-time control system with failure-safety performance composed of microcomputer, other electronic parts and relay components; computer interlocking uses the commonly used industrial control computer and achieves the interlocking relationship between the station annunciator, turnout and inter-turnout through the special software and performs the logical operation and judgment of the interlocking relationship; the system automatically collects the data from annunciator, turnout and track circuit and input the operation control command and various data from the site into the computer and manages the interlocking relationship according to the concrete conditions in the computer and then outputs the action signal to the execution unit to exert control and supervision on the station's signaling equipment, wherein the concrete condition in the computer includes the inherent data of train length which is equal to the length of train with length more than platform;

(8) In the software upgrading program, the inherent data train length are all set as the length of train with length more than platform; i.e. in the software program design, the train length is set as the length of train with length more than platform; The software program of long railroad train ATC system shall be updated to match with the train with length more than platform, wherein the inherent data of train length are all set as the length of train with length more than platform;

The algorithm refers to the basic algorithm used when designing the program. When designing algorithm, set the inherent data train length in the algorithm as the length of train with length more than platform, such as Train Movement Authority LMA, the valid area covered by it is from the train end to the protection points of the train front, the current technique is free of the length of the length of train beyond platform area; LMA management is ATP's core function, its algorithm principle and design implementations are particularly important for the full control of the car; tracking the interval distance is to ensure to keep the safety interval distance that is able to avoid tailgating under a series of adverse conditions; the train-tracing distance is determined in accordance of the maximum permitted speed, the current speed of the following train and the terminal speed and line of the movement authorization;

When design algorithm for software program upgrading system, the following items shall be taken into consideration: safe speed, actual speed, LMA, positioning algorithm, generating the train safe location by database calculation; control host consist of computation module, Zone Controller (ZC), Digital Storage Unit (DSU); vehicle on-board controller (VOBC), calculating running distance by train speed and location automatic detection, permanent speed restrictions, movement authorization of CBTC system, interlocking controlled PMI unit, MAU controlling the train running interval, the vehicle borne Vital Computer; vehicle borne Vital Computer creates the dynamic speed curve, CTCS-3 on-board equipment creates the speed mode curve. What the ATC system of distance code transfers from the ground to the train is the data such as the distance of the front target, on-board computer could calculate operating speed curve which will be used for monitoring the train's actual operating speed based on the data from the ground to the train, including the maximum speed of the section, the distance of the target, permitted speed of the target as well as the inherent data of train length stored in on-board unit; on-board controller could calculate the software designing and programming of the velocity curve of the train based on the regional controller;

The existing algorithm design cannot meet the safety performance requirements of special nature in the ATC system of longer-than-platform train, in order to obtain the reliable and good safety performance, the algorithm must be adjusted, the algorithm will not meet the safety requirements until the completion of adjustment, i.e. in the ATC system computer of longer-than-platform train, the algorithm involved with train length shall set the inherent data train length as the length of train with length more than platform;

The algorithm refers to the basic algorithm used when designing the program. When designing algorithm, set the inherent data train length in the algorithm as the length of train with length more than platform, such as: the computer's design algorithm for movement authorization shall set the inherent data train length as the length of train with length more than platform; Train Movement Authority LMA, the valid area covered by it is from the train end to the protection points of the train front, the current technique is free of the length of train beyond platform area; LMA management is ATP's core function, its algorithm principle and design implementations are particularly important for the full control of the car; tracking the interval distance is to ensure to keep the safety interval distance that is able to avoid tailgating under a series of adverse conditions; the train-tracing distance is calculated based on the maximum permitted speed, the current speed of the following train and the terminal speed and line of the movement authorization, safe brake distance+safe protection distance+distance between ATO protection and ATP protection points+the length of preceding train.

When design algorithm for ATP system software upgrading, the following items shall be taken into consideration: safe speed, actual speed, LMA, positioning algorithm, generating the train safe location by database calculation; control host consist of computation module, Zone Controller (ZC), Digital Storage Unit (DSU); vehicle on-board controller (VOBC), calculating running distance by train speed and location automatic detection, permanent speed restrictions, movement authorization of CBTC system, interlocking controlled PMI unit, MAU controlling the train running interval, the vehicle borne Vital Computer; vehicle borne Vital Computer creates the dynamic speed curve, CTCS-3 on-board equipment creates the speed mode curve. What the ATC system of distance code transfers from the ground to the train is the data such as the distance of the front target, on-board computer could calculate operating speed curve which will be used for monitoring the train's actual operating speed based on the data from the ground to the train, including the maximum speed of the section, the distance of the target, permitted speed of the target as well as the inherent data of train length stored in on-board unit; on-board controller could calculate the software designing and programming of the velocity curve of the train based on the regional controller;

In the ATC system of longer-than-platform train, the LMA of the following trains is the distance between the end of following train and the end of the preceding train, wherein the necessary data includes setting the train length as the length of longer-than-platform railroad train; setting (calculating) LMA based on the movable block principle, this part of line includes the length of train within platform area plus the length of train beyond platform area; The algorithm of LMA of different ATC system software varies; however, each algorithm shall include the length of the train, i.e.: the length of the train shall include the length of train within platform area plus the length of train beyond platform area; the typical algorithm is the following:

Different ATC system software can upgrade ATC system software in accordance of the train length, which includes positioning algorithm, distance algorithm, LMA algorithm, i.e. set or upgrade the current train length (the length of in-platform train) as the length of train within platform area plus the length of train beyond platform area On-board equipment generates the static speed curve of the train based on train data and line data; on-board equipment generates the dynamic train braking mode curve considering all kinds of limitations of train operation, In the software's commutation module system, the inherent data train length of the ATC system of long railroad train (interlocking system included) are all set as the length of train with length more than platform; The core of regional controller is computation module, wherein the concrete condition in the computer includes the inherent data of train length which is equal to the length of train with length more than platform. The calculation function of ATC system from different manufacturers and computation module in different pattern are different, but these calculation functions all contain the inherent data train length; the calculation functions of ATC system of long railroad train and computation module in different pattern all contain the inherent data train length which equals to the length of train with length more than platform;

In the calculation module which calculates the actual speed, safe speed, the fixed speed limit on sections, the temporary speed limit in sections and the maximum speed that enables the train stop safely within LMA, the necessary data train length included is set as the length of train within platform area plus the length of train beyond platform area;

What the ATC system of distance code transfers from the ground to the train is the data such as the distance of the front target, on-board computer could calculate operating speed curve which will be used for monitoring the train's actual operating speed based on the data from the ground to the train, including the maximum speed of the section, the distance of the target, permitted speed of the target as well as the inherent data of train length stored in on-board unit; on-board controller could calculate the software designing and programming of the velocity curve of the train based on the regional controller.

(9) Automatic train operation ATC system can be divided into 2 kinds, one kind is based on railroad circuits, and the other based on wireless communication CBTC system In the Automatic train operation ATC system which based on wireless communication CBTC system, the inherent data train length are all set as the length of train with length more than platform; CBTC system consists of on-board equipment, ground equipment and wireless transmitting equipment DCS, and the said equipment with ATS, CI subsystem equipment together form the CBTC-based signal system; Wherein the on-board equipment are composed of control host, transponder antenna, waveguide antenna and free wave antennas; control host include (but not limited to) computation module and communication module; The ground equipment consist of Zone Controller (ZC) and Digital Storage Unit (DSU); Wireless DSU system providing a transparent data transmission channel is composed of on-board radio unit, wayside wireless equipment, in-station wireless access and management equipment; Train positioning is based on the following information: The ground equipment detected a specific transponder in the circuit; train received messages transmitted from each transponder, wherein an identification number is included; the related transponder's location has been stored in the track database of ATP on-board equipment, therefore, the train can know its specific location in the line; Speedometer and radar measure the train location; based on the transponder detection accuracy, transponder installation accuracy and displacement measurement accuracy, the system exports the train's maximum safety front position, minimum safety end position and the tolerance value, these exported information can be used for describing train position, and the inherent data train length with train itself are all set as the length of train with length more than platform; the train location report shall be sent to wayside Zone Controller (ZC); ZC subsystem will receive non-safe train position information and its current speed from on-board ATP device by way of wireless network, and will provide relative information to the database by way of database consultation, the generated train safety location shall be calculated by database, wherein the necessary data train length are all set as the length of train within platform area plus the length of train beyond platform area; for the computation module of control host, the concrete condition in the computer includes the inherent data of train length which is equal to the length of train with length more than platform;

Train locating and speed measuring: measure train speed by vehicle borne speed sensor and Doppler radar and calculate train running distance by the system, and use speedometer and electronic map to continue positioning the train on the basis of the original train position, and calibrate it by the transponder on the line to accurately position the train, wherein the necessary data train length are all set as the length of train within platform area plus the length of train beyond platform area;

Over speed protection: when establish, supervise and implement ATP curve under the safety brake pattern, on-board ATP will ensure that under no circumstance, the actual train speed (including train with failure) exceeds safe speed; safe speed is determined by some limiting factors: the section permanent speed limit determined by ATP curve and the section temporary speed limit determined by ATP curve, the permanent speed limit suitable for specific train class or configuration; the maximum speed for safe stop within LMA (including actual speed, safe speed, section permanent/temporary speed and the maximum speed for safe stop within LMA, wherein the necessary data train length are all set as the length of train within platform area plus the length of train beyond platform area;

The train of different composition (i.e. train in different length) can run in the same line in different density: the train operating on line shall report its detailed location information in the line to the control center, the information is not about train composition, but about the distance between train head and end, therefore, trains of different composition can operate in the same line with the highest density; wherein the inherent data train length are all set as the length of train with length more than platform;

All the CBTC system are based on software: The software program of long railroad train ATC system shall be updated to match with the railroad train longer than the platform, wherein the inherent data of train length shall be deemed as the length of train with length more than platform; i.e.: the "train length" involved in the design of software program design shall be deemed as the length of train with length more than platform; since software for different CBTC systems varies, and software of different function for the same CBTC system vary either, it cannot be describe in full, however, each CBTC system is the necessary data parameter train length for the software, i.e.: wherein the necessary data train length are all set as the length of train with length more than platform;

Therefore, for all the radio-based CBTC system (this invention chooses Thales's CBTC as key point for explanation convenience) and other radio CBTC system, such as: Siemens CBTC, Seltrac S40 CBTC, Seltrac CBTC, Alstom CBTC, USSI CBTC, LCF-300 CBTC, CITYFLO-650 CBTC, AISTOM CBTC, Alcatel CBTC, Alstom CBTC, wherein the inherent data of train length shall be deemed as the length of train with length more than platform; the software of the same function in the said CBTC system have necessary data parameter train length, i.e.: wherein the inherent data train length are all set as the length of train with length more than platform;

The virtual block system of CBTC system is defined according to the data control of the zone controller instead of block section of physical sense; the moveable block line cancel the physical section division and divides the line into several units pre-defined by database instead; the unit length range from a few meters to a dozen, moveable block section is composed of units of fixed quantity which varies with the train speed and location, and the section length is in dynamic change; i.e.: the block section of virtual block system is defined by database in zone controller, and in its software designing and programming, the inherent data train length are all set as the length of train with length more than platform;

Transponder (localizer beacon) reaches the location in the route database, the train itself automatically measures and calculate the running distance between the preceding detection and transponder, so as to determine the train's relative location, wherein the inherent data train length are all set as the length of train with length more than platform; i.e.: the train itself automatically measure and calculate the software design and programing, wherein the inherent data train length are all set as the length of train with length more than platform;

The equipment subsystem of CBTC system include the following: Automatic Train Supervision (ATS) system, Digital Communication System (DCS), Zone Controller (ZC), Vehicle On-Board Controller (VOBC), control center ATS also contains digital storage unit; wherein the inherent data train length are all set as the length of train with length more than platform;

DCS ensures the communication between any two conjoint subsystems: zone controller and zone controller, zone controller and vehicle on-board controller, automatic train supervision system and zone controller, automatic train supervision system and vehicle on-board controller, automatic train supervision system and digital storage unit, digital storage unit and vehicle on-board controller, digital storage unit and zone controller, wherein the inherent data train length are all set as the length of train with length more than platform;

The core of CBTC system's wayside equipment is zone controller which is used in interlocking controlled PMI (computer interlocking) and MAU controlled by train interval; they all adopt modular structure and are reconfigurable, reprogrammable and expandable, wherein the inherent data train length are all set as the length of train with length more than platform; i.e.: in the software designing and programming for the computation module of train itself, the inherent data train length are all set as the length of train with length more than platform;

The connections between all the zone controllers and data communication backbone network are all redundancy connection; each interlocking station has a ATS working station which has redundancy connection with data communication system; the arrangement of ATS working station varies with different CBTC system, for some system, ATS working stations are arranged in each station; ATS working station without turnout is only suitable for train operation supervision; ATS working station with turnout is suitable for supervision and control, wherein the inherent data train length are all set as the length of train with length more than platform; i.e.: for software designing and programming of ATS working station in each interlocking station, the inherent data train length are all set as the length of train with length more than platform;

For the need of "backup mode operation", equip the axle counter, electrical signal for axle counter and sensor additionally and equip the axle counter evaluation unit in the signal equipment room; wherein the inherent data train length are all set as the length of train with length more than platform;

On-board controller adopts the modular structure and it is reconfigurable, reprogrammable and expandable, wherein the inherent data train length are all set as the length of train with length more than platform; in the modular structure, on-board controller is in charge of software designing and programming for computation module, wherein the inherent data train length are all set as the length of train with length more than platform;

The basic functions of CBTC system can display the information flow between control center ATC, zone controller, database storage unit and on-board controller;

Function allocation of each subsystem: ATS subsystem controls the train access, and for CBTC system, it is used for the setting of train running line. The request access command of ATC sub system is sent into the zone controller and the interlocking PMI unit in the controller will automatically arrange the access according to interlock conditions such as train line and location; software designing and programming of ATS subsystem as well as its inherent data of train length shall be deemed as train with length more than platform;

The data of on-board controller to zone controller and control center: CBTC has the characteristics to automatically and precisely identify the train's location, which is essential for operation control of the train, therefore, all trains could calculate their accurate position in the line based on the beacon and speed sensor data; and these data, including the position of train nose and tail are sent to the zone controller and control center ATC in real time periodically; wherein, the inherent data of train length shall be deemed as the length of train with length more than platform; it means that software designing and programming data of on-board controller to zone controller and control center ATC as well as its inherent data of train length shall be deemed as the length of train with length more than platform;

On-board controller calculates the speed curve of the train based on the LMA provided by the movement authority unit of the zone controller; in the meanwhile, it also transfers the data including starting and ending position of train composition and movement authority limit of the train; wherein, the inherent data of train length shall be deemed as the length of train with length more than platform; it means that the on-board controller calculates the software designing and programming data of the speed curve of the train based on the LMA provided by the movement authority unit of the zone controller, wherein, the inherent data of train length shall be deemed as the length of train with length more than platform;

Software designing and programming for the transmission of the data including starting and ending position of train composition and movement authority limit of the train, wherein, the inherent data of train length shall be deemed as the length of train with length more than platform;

The track circuit based automatic train operation system (ATC): therefore, the track circuit based automatic train operation system: this invention chooses track circuit based ATC system for easy description, including Wabtec ATC, Siemens ATC, US & S ATC, AISTOM ATC and domestic experimental moving block ATC system.

ATS subsystem at management level is more inclined to achieve safe operation command through software method; ATP subsystem which is used to send and receive various commands ensures the safety operation of the train and keeps control of operation access, speed and intervals of the train; on-board ATP subsystem receives the command from wayside ATP equipment and provides over-speed protection for the running train and sends the relevant information after checking to the on-board ATO subsystem, thus allowing automatic and adjustment of the train speed;

Dispatching control mode: control level of ATC system: full auto mode of the control center, auto dispatch mode, centralized manual mode of the control center and auto control mode of the station; wherein the inherent data of train length shall be deemed as the length of train with length more than platform;

ATP system with speed mode, wherein the inherent data of train length shall be deemed as the length of train with length more than platform;

what the ATC system with distance code transfers from the ground to the train is the data such as the distance of the front target, on-board computer could calculate operating speed curve which will be used for monitoring the train's actual operating speed based on the data from the ground to the train, including the maximum speed of the section, the distance of the target, permitted speed of the target as well as the inherent data of train length stored in on-board unit; on-board controller could calculate the software designing and programming of the speed curve of the train based on the zone controller, wherein the inherent data of train length shall be deemed as the length of train with length more than platform;

Automatic over-speed protection of the train: ATP subsystem sends ATP datagram to the train continuously with the use of track circuit; ATP wayside unit receives ATP command from the "idle" condition and the interlock condition of the track circuit and the ATP command will be sent to the track circuit and then to the on-board ATP through the rail, The command received by the on-board ATP equipment shall include at least the target speed (target distance) which shall be used to calculate the operating speed of the train on the current location by the ATP equipment;

The target speed and target distance: ATP wayside equipment allocates a "target speed" to the train within its control which shall be generated into the corresponding code by the track circuit to inform the number of vacant track section in front of the train; on-board ATP device receives the above data from the ground and calls the line information from the memory to calculate the operating speed and the maximum operating distance of the train at any time to stop safely before arriving at the obstacle or restricted area;

The ATP device will automatically check the track section of the train with the use of message data received; it could determine the absolute position of the train in the line with the use of data from the "location" beacon on the fixed position in the line; it could almost locate the accurate position of the train in the line with the use of the relative position of the train worked out by the speed sensor of the train; the on-board ATP device could calculate the maximum safety distance or target distance of the train through the comparison of the "target distance" received by the ATP device and the real-time position of the train and the combination of the data of the line stored in the on-board ATP and ATO memory, the on-board ATP device could calculate the real-time operating speed of the train and then the train could enter into the vacant train sections behind those occupied by the preceding trains; the real-time speed of the running train will be compared with the permitted speed calculated consistently and the train will automatically start emergency brake if the real-time speed is larger than the permitted speed.

ATP subsystem consistently sends the data of the interlock equipment and the data at management level, line data and data of front target distance as well as permitted speed from the ground to the train via the track circuit which will be calculated by the on-board computer to generate the current permitted operating speed or calculated by the operation control center to generate the target speed for the train; the actual speed will be measured by the on-board equipment which shall be the basis for monitoring the train's speed and keep the train always operating within the safety speed; software designing and programming data of the speed curve of the train shall be worked out, wherein the inherent data of train length shall be deemed as the length of train with length more than platform;

The track circuit based ATC system consists of track circuit sending and receiving unit in the signal equipment room, wayside tuning unit and on-board ATP equipment;

The on-board ATP subsystem calculates the target speed of the train in real time based on the data from the ATP receiving antenna and the pre-stored speed-limit data of the train; the target speed is compared with the actual speed of the train measured by the speed sensor and brake control will be initiated if it is larger than the permitted speed;

The main functions of the ATP subsystem: train position detection, train operation interval, temporary control for speed limit, speed and distance measurement, parking control and door control; the functions of ATP subsystem based on digital coded track circuit: ATP wayside functions, ATP transfer functions and ATP on-board functions;

ATP wayside functions are responsible for safety interval control of the train and datagram as well as the coding and sending of the datagram for the authority of the train's safety operation;

Safety interval control of the train: this function is used to maintain the minimum safety distance between the train and the ATP subsystem which will give the operation authority for the train only when the train's operation access has been established with the use of the interlock system and passes corresponding interface;

The operation authority given by the ATP wayside equipment is determined by the selection and activation of the corresponding safety stopping point of the train; while the selection of the safety stopping point is based on the status of the track section in the train operation access; the position indicator of the safety stopping point in track circuit based ATP system is basically corresponding to the boundary point of the track section which shall be determined during the design of signal system; these data are stored in ATP wayside equipment and the selection of the safety stopping point actually provides safety operation distance for the train;

Take ATP subsystem in the form of "target speed" for example, the safety stopping point for the following trains is the entrance of the track section for the preceding trains which is the absolute position for the following train to come to a stop, and in order to improve the safety factor, the safety stopping point shall indeed be located at the entrance of the track section behind that of the preceding trains and the minimum interval between the two trains in sequence shall be equal to the length of a track section, therefore, the target speed of following trains running in each track section can be calculated on such a base.

The division of the block section of ATP subsystem wayside equipment and the determination of the safety interval of the train shall be determined by the train's operation stimulation during block design and verified by the train's actual operation, in order to ensure the train's safety operation, the protection section shall be provided in front of the safety protection sites which is in accordance with the requirements of safety protection distance; the safety protection distance involved with signal system control mode and vehicle performance shall be mainly determined by the compliance with the distance of emergency brake under certain speed, under the circumstance of the train's tracking operation, the distance of train tail and vehicle rear axle shall be added to the safety protection distance, wherein the inherent data of train length shall be deemed as the length of train with length more than platform;

The interlock system with branch stations on the main line shall be interlocked with the computer; most of its control mode shall be under the control of computer interlocking system; some lines will locate their station interlocking system on the entire line in the control center which shall be under the control of the computer interlocking system in the control center, the software designing and programming of the computer interlocking system in computer interlocking and control center, wherein the inherent data of train length shall be deemed as the length of train with length more than platform;

The on-board ATP speed (distance) signal is the main signal of the train; the on-board signal shall include at least the actual operating speed of the train and the target speed in front of the train; the software designing and programming of the computer module, wherein the inherent data of train length shall be deemed as the length of train with length more than platform;

Tiered braking mode: the whole braking distance shall be finished at several stages according to the distance between the train and its preceding train and each block section shall finish the corresponding braking stage, therefore, each block section shall determine the speed limit based on its distance to the preceding train; automatic brake of the train will be initiated when the train's speed is larger than speed limit and thus it is lagging supervision, it means over-speed is supervised only at the exit of the block section; in order to ensure safety, the "protection section" must be provided, which means the minimum interval between the following trains and the preceding trains shall be equal at least to the length of a block section, the software designing and programming of the computer module, wherein the inherent data of train length shall be deemed as the length of train with length more than platform;

(Curved brake: the communication based automatic control system of the train—CBTC system has adopted curved brake: the precondition of curved brake is the brake based on "target distance"; the trains in the line will automatically detect their specific position in the line and send the position data to the control center, and the control center calculates the "movement authority"—target distance of the train according to the train's operation condition. The train will calculate the speed curve of the train based on the datagram including the distance from the control center and keep the train operating at high speed safely at any time; information transformation is finished in both wire and wireless mode; the information from the control center of CBTC system to the train shall include line map within the train's access, the permitted speed within the section, target distance and target speed, etc. It is obvious that within the moving block based CBTC system, the two-way exchange information between the train and the control center is a permanent existence. The "target distance" of the train shall be constantly updated to ensure the safety operating interval of the train;

The digital coded track circuit transmission based ATP system in the form of "target distance" shall be classified as quasi-moving block system which is inferior to moving block and superior to fixed block system; the key is that the train could automatically detect its position in the line as done by the moving block system, while its braking point is still the boundary point of the track circuit; therefore, the stopping point of the speed curve of the preceding trains could be the entry point of the track section occupied by the preceding trains;

provision of no "protection section" helps to reduce the operating interval; it is different from the moving block as it is free from the restriction of the boundary point of the track circuit, it could constantly modify and calculate the speed curve based on the distance to the preceding trains; therefore, for quasi-moving block ATP subsystem, from the division of the track section, it can be deemed as tiered braking mode, while it fully possesses the ability to control the distance, thus it is suitable to classify quasi-moving block ATP subsystem into curved brake; )

Speed limit: it can be divided into fixed speed, temporary speed, turnout section speed limit and safety line speed limit which shall be determined during the design stage. The information of fixed speed limit area on the main line is stored in on-board ATP\ATO subsystem, the software designing and programming of the computer module, wherein the inherent data of train length shall be deemed as the length of train with length more than platform;

For AIP subsystem based on the form of "distance positioning", the tracking interval of the train is not dependent on the division of the block section due to the tracking operation of the following trains which is not dependent on the number of block sections with the preceding trains but the fact that the interval with the preceding trains shall be larger than the braking distance; at it is not a moving block, no block section of different lengths will be divided in the line, however, the interval between the trains is not based on the division of the block sections (track circuits), and the information to the train is the "access map" of the forwarding train and the information is the same within the same section, therefore, no emergency stop will happen if no instantaneous ATP information is received by the train on each division point of the track circuit; for the intermediate region between the preceding trains and the following trains, even no block section for protection is provided, end collision will not happen; the pattern that the following train could enter into the division point of the block section previously occupied by the preceding trains is deemed as quasi-moving block; given that the interval management of the train has been transformed into the control of on-board intelligent system, the train could preset its operation command according to the safety operation distance to obtain the optimum tracking interval; the software designing and programming of the computer module, wherein the inherent data of train length shall be deemed as the length of train with length more than platform;

The on-board ATP subsystem is the critical equipment to ensure the safety operation of the train which coordinates with the ground ATP device to receive and interpret the speed or distance signals and provides over-speed protection to keep the train operating at the speed within that specified by the "speed command", and this function is done by over-speed protection controller CPU; the over-speed protection controller CPU receives the limit speed from the system CPU as well as the actual speed of the train from the speed sensor, for example, when the actual speed of the train has exceeded the ATP limit speed and causes over-speed status, in the Auto mode, the train will automatically adjust its speed; the software designing and programming of the computer module, wherein the inherent data of train length shall be deemed as the length of train with length more than platform;

(10) In high-speed rail system the inherent data of train length shall be deemed as the length of train with length more than platform; CTCS-3 train control system, CTCS-2 trail control system and so forth, including high-speed railroad signal and control system are all known as Advanced Train Control Systems (ATCS), such as high-speed railroad signal and control system, including ATCS and ARES of North America, ETCS of Europe, ASTREE of France and CARAT of Japan, etc; wherein the inherent data of train length shall be deemed as the length of train with length more than platform; this invention take CTCS-3 train control system and CTCS-2 train control system as example to illustrate:

The VC of CTCS-2 on-board equipment is the core of ATP device, it is used to collect information from ATP modules, generate the curve of braking mode and send braking information to the train via the obstacle—safety circuit if necessary and maintain the safety of the train; wherein the inherent data of train length shall be deemed as the length of train with length more than platform; the CTCS-3 train control system consists of ground equipment and on-board equipment, and the ground equipment is composed of radio block center (RBC), train control center (TCC), ZPW-2000(UM) series track circuit, balise (including LEU); VC of the on-board equipment, GSM-R wireless communication unit (RTU), track circuit information receiving unit (TCR), balise information receiving module (BTM), recording unit (JRU\DRU); wherein the inherent data of train length shall be deemed as the length of train with length more than platform;

RBC generates movement authority according to the track circuit and interlock access, including movement authority (MA), shortened movement authority (SMA), unconditional emergency stop message (UEM), conditional emergency stop message (CEM) and outputs the movement authority, temporary limit speed and line parameters to CTCS-3 on-board equipment through RSM-R wireless communication system; in the meantime, it receives the information of the position and train data from the on-board equipment through GSM-R wireless communication system; wherein the inherent data of train length shall be deemed as the length of train with length more than platform;

TCC receives the information from the track circuit and transmits it to RBC through the interlock system; in the meantime, it has the functions which could meet the demand of the backup system including track coding, balise message storage and calling, transmission of safety information among the stations, temporary speed limit; wherein the inherent data of train length shall be deemed as the length of train with length more than platform;

The balise transmits the information including locating and level transformation data to the on-board equipment, in the meantime, it transmits the information including line parameters and temporary speed limit to the on-board equipment to meet the demand of the backup system; wherein the inherent data of train length shall be deemed as the length of train with length more than platform;

Based on the movement authority, line parameters, temporary speed limit and the parameter of the EMUs provided by the ground equipment, the on-board VC could generate the dynamic speed curve in accordance with the continuous speed control mode of the target distance to monitor the train and ensure its safety operation; wherein the inherent data of train length shall be deemed as the length of train with length more than platform;

The CTCS-3 control unit and CTCS-2 control unit in the on-board VC are idependent, wherein the CTCS-3 is responsible for the core control functions of the CTCS-3 line during its normal operation and the CTCS-2 is responsible for the core control functions of its backup system; wherein the inherent data of train length shall be deemed as the length of train with length more than platform;

CTCS-3 on-board equipment is used for receiving the data and command information from the ground, generate the curve of speed mode, monitor the train's operation and ensure the safety operation of the train; wherein the inherent data of train length shall be deemed as the length of train with length more than platform;

Data input and storage: the on-board equipment could record the train parameters from the external, including train length and maximum permitted speed of the train, etc.; wherein the inherent data of train length shall be deemed as the length of train with length more than platform;

Data sending and receiving: the on-board equipment sends the input of the driver and acknowledged data (the length of the train, the data of the inherent property of the train (maximum permitted speed of the train)) through the GSM-R wireless communication system to RBC, the on-board equipment is registered in RMC and periodically sends to RBC the position of the train, the speed of the train, restricted information for car receiving and text message; wherein the inherent data of train length shall be deemed as the length of train with length more than platform;

The on-board equipment receives the data from RBC including movement authority (including the identification number of the on-board equipment, target distance, target speed and the possible unlock information, the information of the protection area), emergency stop (unconditional emergency stop and conditional emergency stop), temporary speed limit, text message and other data; wherein the inherent data of train length shall be deemed as the length of train with length more than platform;

The on-board equipment gets the position of the train from the balise; wherein the inherent data of train length shall be deemed as the length of train with length more than platform;

The on-board equipment generates static speed curve of the train based on train data and line data. The static speed curve considers the speed class of the line, permitted speed of the line and speed limit of the train when calculating the permitted speed of the train at all positions in the line; wherein the inherent data of train length shall be deemed as the length of train with length more than platform;

The calculation of the dynamic curve: the on-board equipment generates the dynamic curve of braking mode of the train on the basis of various restrictions of the operation of the train and the dynamic curve consists of commonly used full-braking curve and emergency braking curve; the equitation and parameters for calculating the dynamic curve of braking mode of the train shall be reviewed and the braking curve shall be optimized as more as possible under the premise of safety to reduce the braking distance; wherein the inherent data of train length shall be deemed as the length of train with length more than platform;

Train positioning: the on-board equipment has the function to determine the position of the train and the working principle of the function is that the data from the ground balise is received and set as datum point, and then the operation distance of the train is measured through speed measuring unit and other devices to obtain the position of the train; the error of the speed measuring equipment is considered when calculating the position of the train; wherein the inherent data of train length shall be deemed as the length of train with length more than platform;

The measurement of speed: the on-board equipment is able to measure the operating speed of the train in real time through the speed sensor on the wheel and the radar on the carbody, the speed measuring unit performs measurement and logical operation of the input of the speed sensor and radar and obtains the actual speed of the train, in the meantime, it transfers the operating speed of the train to the host module; wherein the inherent data of train length shall be deemed as the length of train with length more than platform;

ATC system of the train with length more than platform in this invention is referred to as "ATC system of the long railroad train" (unless otherwise specifically specified in the invention, the railroad train refers to the metro train, light rail train, maglev train, high-speed railroad (or high-speed train and EMU train), intercity light rail train, intercity light rail commuter train; and the railroad train shall include double-track trains) and is a whole part composed of railroad train with hardware more than platform, i.e.: the railroad trains with door car within platform area (referred to as the length of railroad train beyond platform area) and automatic control system (ATC); called as a whole system composed of the train with length more than platform and the automatic control system ATC;

The safety positioning system of the train shall include: track circuit positioning, axle counter positioning, speed measuring equipment positioning (including wheel speed odometer, Doppler radar and tachogenerator), balise positioning, inductive loop positioning, wireless spread-spectrum positioning and inertial positioning system; the length of the train in these train positioning systems shall be the length of train within platform area plus the length parameters recorded by all positioners of the long railroad train ATC, including the balise of the train's positioning beacon, axle counter (or ACE composed of microcomputer), track circuit for train positioning (station function for line supervision), wayside indication sign, ground annunciator and on-board signal, wherein the train length in these positioners shall be the length of train with length more than platform;

The length parameters of the train in all storage units of the ATC system of long railroad train shall be the length of trains within platform area plus that of trains beyond platform area; i.e.: in the database storage unit: the length of the train shall be set as the length of train with length more than platform; i.e.: the data storage unit, including the storage unit of the controller, the storage unit of ATC zone controller or on-board ATC storage unit, DSU database, embedded database, real-time database, e.g.: RTDB; the length of train with length more than platform shall be increased and included the length of trains within platform area plus that of trains beyond platform area and shall be only stored in a read-only database; since it has great importance and in order to avoid loss or random change, the length of train with length more than platform shall be increased and included the length of train within platform area plus that of train beyond platform area and shall be only stored in a read-only database;

Fixed block, moving block, movement authority of "target-distance" control system, limit of movement authority (LMA), movement authority (MA) of train control system of high-speed railroad. During the design of the length of block section in fixed block, the length of train with length more than platform is designed as the length of train within platform area plus the length of train beyond platform area, the most unfavorable braking ratio and other unfavorable conditions are used.

To calculate the algorithm of LMA, (generation method of MA of long railroad train CTCS-3 train control system and CTCS-2 train control system), algorithm of MA of high-speed railroad train control system, the inherent data of train length shall be the length of train with length more than platform;

The concrete conditional train length is the length of train with length more than platform; interlocking function: respond to the command from ATS function, control the access, turnout and signal under the premise of safety, send the status data of access, track circuit, turnout and signal to ATSATC functions and the interlocking function is achieved by the wayside equipment; computer interlocking is a real-time control system with failure-safety performance composed of microcomputer, other electronic parts and relay components; computer interlocking uses the commonly used industrial control computer and achieves the interlocking relationship between the station annunciator, turnout and inter-turnout through the special software and performs the logical operation and judgment of the interlocking relationship; the system automatically collects the data from annunciator, turnout and track circuit and input the operation control command and various data from the site into the computer and manages the interlocking relationship according to the concrete conditions in the computer and then outputs the action signal to the execution unit to exert control and supervision on the station's signaling equipment, wherein the concrete condition in the computer includes the inherent data of train length which is equal to the length of train with length more than platform.

The software program of long railroad train ATC system shall be updated to match with the train with length more than platform, wherein the inherent data of train length shall be deemed as the length of train with length more than platform;

The software program shall be updated and rewritten to match with the train with length more than platform, The algorithm of LMA of different ATC system software varies; however, each algorithm shall include the length of the train, i.e.: the length of the train shall include the length of train within platform area plus the length of train beyond platform area;

For application software of long railroad train ATC system, the database shall be modified, i.e.: the inherent data of train length in the storage unit (including on-board storage unit), arithmetic unit or algorithmic function shall be the length of train with length more than platform;

Specific implementing mode:

The ATC system of the existing railroad train could perform hardware updating or new software program rewriting according to the length of the train composition and constitute ATC system of train with length more than platform with train with length more than platform; including Wabtec ATC, Siemens ATC, US & S ATC, AISTOM ATC and domestic experimental moving block ATC system, Siemens CBTC, Seltrac S40 CBTC, Seltrac CBTC, Alstom CBTC, USSI CBTC, LCF-300 CBTC, CITYFLO-650 CBTC, AISTOM CBTC, Alcatel CBTC, Alstom CBTC, CTCS-3 train control system, CTCS-2 train control system and etc.

The train length in the signal system of railroad train composition longer than the platform is the length of train with length more than platform, i.e.: the length of train within platform area plus that of train beyond platform area with door-free car; the train length in the train's signal system is the length of train with length more than platform;

Namely, to prevent end-collision of railroad passenger car composition longer than the platform, in the signal subsystems of which all the train length shall be designed as the length of railroad train with in platform plus that of train beyond platform area; signal system SIG consists of the automatic control system (ATC) and the universal peripheral signal equipment, including the automatic control (ATC) system and interlock system;

Since the signal system of railroad train composition longer than the platform can be used in combination with that of existing railroad train composition longer than the platform, the signal system of long railroad train (including automatic control system and interlock system of the train) shall have at least one group of data with its train length equal to that of train with length more than platform, i.e.: the signal system of train with length more than platform;

The automatic control system of train with length more than platform has been designed, including ATC system and high-speed railroad signal and automatic control system which shall be referred to as advanced train control system (ATCS); this invention is a whole part composed of railroad train with hardware longer than the platform, i.e.: the length of railroad train within platform area plus that of railroad train beyond platform area without doors (referred to as the length of railroad train beyond platform area) and automatic control system (ATC); called as the ATC system of train with length more than platform;

The technical features: the train length in the automatic control system of the existing railroad train shall be designed as the length of railroad train within platform area plus that of train beyond platform area and shall be used to constitute the signal subsystem of train with length more than platform, including the automatic control system;

The length of railroad train in the automatic control system of the train with length more than platform shall be reset, i.e.: the inherent data of train length shall be set as the length of train within platform area plus that of train beyond platform area; and it has the following representations:

During the design of hardware of train with length more than platform: the inherent data of train length in safety positioning of the train, storage unit (including the database), data storage unit of CBTC system, DSU database and embedded database shall be designed as the length of train with length more than platform; the inherent data of train length in real-time database (RTDB) and high-speed railroad database and block section in ATC system in train with length more than platform shall be set as the length of train with length more than platform; (For the block section system in ATC system of train with length more than platform, including fixed block system, quasi-moving block system, moving block system, virtual block system, the inherent data of train length shall be set as the length of train with length more than platform; the virtual block system is defined according to the data control of the zone controller instead of block section of physical sense; for limit of movement authority (LMA), calculation function of LMA and new software program rewriting, the inherent data of train length shall be set as the length of train with length more than platform; for computer interlocking system, the inherent data of train length shall be set as the length of train with length more than platform; for target-distance control mode (also known as continuous one-time braking speed control mode), the inherent data of train length shall be set as the length of train with length more than platform; the train length involved in the following communication modes shall be the length of train with length more than platform.
1. Intermittent ATC;
2. Continuous ATC: 1) track circuit based continuous ATC system;
(1) Speed code system;
(2) Distance speed system;
2) Continuous ATC system with the use of rail cable;
3) Wireless ATC system: the wireless communication is achieved through the use of waveguide, leakage cable and wireless space antenna.

Emergency brake, train position, speed and line interlocking: the train length in the block section of TBTC\CBTC system as well as that in recording, remote diagnostic and monitoring function of CBTC system is the length of train with length more than platform.

The interlocking equipment is divided into relay centralized interlocking equipment and computer interlocking equipment; the computer interlocking achieves the interlock and control on annunciator, turnout and access after the logical operation of operating command from the on-site attendant and the identification information of the site monitoring equipment. Wherein the train length in relay centralized interlocking and computer interlocking system is the length of train with length more than platform.

The speed control mode can be divided into two kinds: stepped speed control curved control of speed-target distance mode; wherein the train length is the length of train with length more than platform.

(1) The stepped speed control take the block section as unit and each block section has a target speed, and the limited speed shall be always used to judge whether the train has exceeded the speed limit regardless of the position of the train. The tracking interval of the train in stepped speed control system is related to the division of block section and the performance and speed of the train, while the length of block section is determined on the basis of the train with the worst performance and in combination with the line parameters. The stepped speed control can be divided into tiered and piece-wise curved type;

The segmented braking speed control curve provided by the piece-wise curved control equipment of the train is determined by the line parameters of each block section and the inherent performance of the train, and the line parameters of block section can be transferred from the ground to the train or can be obtained through the storage and review in on-board signaling equipment. The data from the ground equipment to the on-board equipment is the basis for the speed, distance and line conditions of the following block section and it is not the complete data for the target, therefore, the data generated by the system is stepped continuous braking mode curve. Since the braking speed control curve is provided segmentally, the line parameters for one block section shall be provided every time.

Wherein the train length involved in the calculation of segmental braking speed control curve shall be deemed as the length of train with length more than platform;

Wherein the train length involved in the tracking interval of stepped speed control system shall be deemed as the length of train with length more than platform;

Wherein the train length involved in the tracking interval of stepped speed control system shall be deemed as the length of train with length more than platform; and the train length involved in the division of block section shall be deemed as the length of train with length more than platform.

2) Curved control of speed-target distance mode: it has adopted continuous one-time braking speed control mode as its brake mode, i.e.: the train braking curve is determined according to target distance, target speed and inherent performance of the train and the speed class of each block section is not set. For continuous one-time speed control mode, if the entrance of block section occupied by the preceding trains is set as tracking target, it shall be deemed as quasi-moving block, and if the tail of front train is set as the tracking target, it shall be deemed as moving block; the following trains shall operate and stop at the speed permitted by the speed control curve which is the result of target distance, the weight, length and braking performance of the train and other parameters.

Wherein the train length involved shall be deemed as the length of train with length more than platform. The weight of the train shall be deemed at that of train with length more than platform.

The train length involved in CBTC system shall be deemed as the length of train with length more than platform.

The foundation of CBTC system is "train positioning", i.e.: only when the accurate position of the train is known can absolute position of the train be calculated and the safety interval of the train can be guaranteed; also only when the accurate position of the train is known can appropriate speed control on the train be applied according to the line conditions. With the train's speed and distance measurement as well as ground balise or other sensor's measurement of the position of the train, CBTC system is able to query the system database and locate the train. Train-ground communication and train positioning constitute the two pillars of CBTC system.

The basic principle of CBTC system: the dispatching control center (DCC) controls several station control centers (SCC) and thus achieving control exchange between adjacent SCC. It achieves bi-directional communication with the on-board equipment (OBE) within its coverage through several base stations (BC). During the operation of the train within the section, GPS, inquiry balise or odometer are used to measure the position and speed of the train, and the OBE sends the position and speed of the train to SCC through BC with wireless method. SCC sends the target position, speed and line parameters to the following trains through BC periodically. After receiving the data by OBE, according to the operating status of the preceding trains (position, speed, and condition), line parameters (curve, gradient and etc.), the operating status of the current train, the parameters of the train (the length of the train, traction weight, braking performance and etc.), OBE is able to predict whether the train could meet the demand of tracking interval of the train at the end of information cycle through on-vehicle calculation, ground SCC calculation or the simultaneous calculation of the vehicle and ground by the means of comparison and selection of signal-safety principles, thus determining the proper driving strategy and ensuring the high-speed and smooth operation of the train at optimal interval within the section.

The structure of CBTC system is the key of this invention:
Generally, typical CBTC system shall include: automatic train supervision system (ATS), databse storage unit (DSU), zone controller (ZC), computer interlocking (CI), wayside equipment (WE), vehicle on-board controller (VOBC) and data communication system (DCS), wherein the DCS shall include the backbone network, network switch, wireless access point, on-board mobile wireless equipment and etc., and zone control center shall include ZC and CI. The whole system can be divided into CBTC ground equipment and CBTC on-board equipment which are connected through data communication network and constitute the core functions of the system. Each system shall execute the functions required by CBTC system independently.

The inherent data of train length in computer software algorithm of ATC system of train with length more than platform (including interlock system) shall be deemed as the length of train with length more than platform; i.e.: the "train length" involved in the design of software program algorithm shall be deemed as the length of train with length more than platform;

For all EMU trains, the inherent data of train length for the security positioning, storage unit, storage unit (database unit included), ATP on-board equipment, ground control center (TCC), interlocking IXL, LEU, ZFW2000 and radio block center (RBC) shall be deemed as the length of train with length more than platform;

The wireless communication is achieved through the use of waveguide, leakage cable and wireless space antenna;

2. The functions of subsystems

1) ATS subsystem

The ATS subsystem is mainly responsible for the display of operating status of the train and the status of the equipment within the control of control center. According to the requirements of CBTC system, the settings of the ATS system shall include operator workstation, timetable workstation, training workstation and other corresponding equipment and networks.

2) CI subsystem

CI subsystem is mainly responsible for supervision and direct control of turnout, track section, annunciator and other outdoor facilities to ensure the correct interlocking relationship among the equipment and the safety operation of the train; it provides effective protection against the wrong operation from the equipment; it could apply for access and cancel the access according to the starting end and terminal end of the access.

3) ZC subsystem

ZC subsystem shall generate movement authority for the train within the control range of ZC according to the status information and data information from OBC, CI, ATS and DSU and send the MA through DCS to VOBC equipment timely to control the operation of the train.

4) VOBC subsystem

In VOBC, to ensure safety, the train shall be able to accurately determine its position and direction of operation.

For position determination, the on-board computer of the train shall cooperate with the tachometer, speed sensor, accelerometer (to measure distance, speed and acceleration) and wayside positioner to accurately locate the train.

5) DSU subsystem

In CBTC system, train positioning is no longer dependent on the track circuit but the on-board equipment, which requires the consistent data for ground and on-board equipment for unified dispatching and coordination of the whole system. DSU is the subsystem used to manage the data of the whole CBTC system which includes static database, dynamic database, configuration database, parameter database and etc. In CBTC system, the safety and importance of database are obvious; therefore, redundant design shall be used to ensure it has the equivalent security level to that of ZC and CI equipment.

The structures mentioned above are only typical structure of CBTC system and the actual system may have some differences due to the equipment supplier and engineering requirements.

Moving block technology: the control center could calculate the maximum braking distance of the train according to real-time speed and positions. The length of the train plus the maximum braking distance as well as the protection distance behind the train shall constitute a virtual section moving simultaneously with the train. Since the safety distance in front and behind the train can be ensured, the two adjacent moving block sections are able to operate forward simultaneously at small interval, and the train could thus operating at a high speed and small interval.)

According to the communication mode, the ATC system can be divided into 1) intermittent ATC system: its on-board equipment receives the balise data from signal point or mark points as well as the data concerning the speed and brake of the train, while outputs control command which is shown to the driver. The ground balise transfers the data concerning the permitted speed of the signal point, target speed, target distance, line gradient, and annunciator number to the train.

2) Continuous ATC system:

1) Continuous ATC system with the use of track circuit:

(1) Speed code system: the use of frequency division system and frequency-shift track circuit, i.e.: different frequency is used to represent different permitted speed. It transfers the maximum permitted speed of the train through information transmission media to the train, and such type is relatively easier in terms of data transmission and on-vehicle data processing, while the tiered speed classification is used.

(2) Distance code system: time division type numeric code shall be used due to the diversity and complexity of message code and various information is made possible according to the protocol. ATC with the use of digital coded audio frequency track circuit is widely used at present and it has been adopted by most cities in China.

According to a series of basic data provided by distance code system from the ground to the train, the on-board computer could calculate permitted speed curve in real time based on the various data from the ground to the train (including the maximum speed within the section, the distance of the target point, the gradient of line within the section) and the inherent data of train (such as the length of the train, braking ratio of service braking and emergency brake, speed and distance measurement) in the on-board storage unit and monitor the actual operating speed of the train on the basis of the curve.

2) Continuous ATC system with the use of rail cable: its main equipment shall include the equipment for control center, wayside equipment and on-board equipment; and it achieves data transmission through rail cable. The staggered arrangement of rail cable can be used to locate the train according to the principle that the position of the train can be determined due to the change of signal polarity and counting when the train is passing through the intersection of the cable. The control center has the storage of fixed date of the line (such as the gradient of the line, curve radius, the location of turnout, and the location and length of circular section), the interlock system transfers the signal display, the location of turnout and other data to the control center, in the meantime, the train also transfers the speed, length and carrying capacity of the train to the control center through the cable. The computer of control center calculates the permitted speed of the train based on these data and then transfers the permitted speed of the train to the corresponding train running on the line in order to control the train. The control center is able to command all running trains in such a way, but once the control center fails, the whole line will collapse. Another method is that the control center and interlock system transfer the data concerning the line and target speed to the train through the cable, and then the computer of the train calculates the permitted speed of the train and controls the train.

3) Wireless ATC system: the ground encoder generates coded message and transfers the data concerning the permitted speed of the train, gradient and distance to the train through the antenna. And the on-board processing unit will handle the data and calculate the target speed of the train and control the train. Only the ground to train data transmission of ATC through wireless method is the true moving block. The wireless communication is achieved through the use of waveguide, leakage cable and wireless space antenna;

The emergency door can be also used as a ladder by folding its lower part to evacuate the passengers in emergency and its upper part consists of the right and left folding door. To get off the train through the emergency door or the ladder.

The invention claimed is:

1. A fare collection system for a railroad train with length more than an associated platform, comprising;
    first data indicative of a plurality of stations on a rail line upon which a railroad train is to travel, the first data indicative of the plurality of stations divided into at least two railroad sections on a basis of a length of a journey; and
    second data indicative of each railroad train on the rail line divided into at least two riding sections which respectively correspond to one railroad section with two directions, a front direction and a rear direction, the riding section being indicated by a riding section sign with a more distant riding section sign indicating a more distant riding section of the railroad train and more near riding section sign indicating a center riding section of the railroad train
    the fare collection system configured to sell the ticket havinq the riding section sign corresponding to either the more distant riding section of the railroad train or the center riding section.

2. The fare collection system according to claim 1, further comprising a ticket that is printed with the riding section sign, wherein the ticket belongs to at least one of a high-speed train ticket, a normal train ticket, an inter-city light rail train ticket, a maglev train ticket, a metro ticket or light rail train ticket.

3. The fare collection system according to claim 2, wherein the ticket includes memory into which the riding section sign is written, the ticket comprising one of an IC card ticket, a metro ticket, a light rail train ticket, a maglev train ticket, a inter-city train ticket, a non-contact city "one-card-for-all" IC card, anon-contact IC card ticket, a PASMO ticket, a CPU card ticket, a M1 card ticket, a one-way IC card ticket, a magnetic card ticket, or a one-way magnetic card ticket.

4. The fare collection system according to claim 2, further comprising an inbound ticket checking machine and an outbound ticket checking machine wherein the riding section information between the inbound ticket checking machine and the outbound ticket checking machine is set in readers of either the platform or car, wherein information of the riding section sign is exchanged between the ticket and the reader, the reader communicating with the fare collection system and transmits the information to the fare collection system to allow the outbound ticket checking machine to identify the information recorded by the ticket.

5. The fare collection system according to claim 4, wherein the ticket comprises an outbound ticket price obtained from a inbound station number recorded on the ticket by the inbound ticket checking machine.

6. The fare collection system according to claim 4, wherein the ticket comprises a number of stations covered by the journey.

7. The fare collection system according to claim 6, wherein for a long-journey passenger failing to swipe the ticket, a fare is determined in accordance with an actual ticket price.

8. The fare collection system according to claim 6, wherein the system prevents a short-journey passenger from getting into a side-door car and causing congestion, such that when the short-journey passenger swipes the ticket, a certain amount of a ticket price is deducted.

9. The fare collection system according to claim 4, wherein the reader comprises a magnetic card recorder or an IC card reader.

10. The fare collection system according to claim 1, further comprising:
    a ticket clearing and distributing central computer system, a line central computer system, a station computer system, and station terminal equipment.

11. The fare collection system according to claim 10 further comprising a database containing a plurality of stored riding section signs.

12. The fare collection system according to claim 10, further comprising a ticket calculating system containing departing station and target station on the ticket and fare calculated from the riding section signs from a reader between inbound ticket checking machine and outbound ticket checking machine.

13. The fare collection system according to claim 10, wherein the ticket records the riding section sign.

14. The fare collection system according to claim 10, further comprising at least one of an off-network system, a wireless communication system, a wired network system or a mobile communication system.

15. The fare collection system according to claim 1, wherein the riding section sign is used to differentiate different riding section and the riding section sign includes symbols, numbers and words to indicate the riding section.

16. The fare collection system according to claim 1, wherein each ticket sold includes the riding section sign.

* * * * *